United States Patent [19]

Batarseh et al.

[11] Patent Number: 5,636,106
[45] Date of Patent: *Jun. 3, 1997

[54] VARIABLE FREQUENCY CONTROLLED ZERO-VOLTAGE SWITCHING SINGLE-ENDED CURRENT-FED DC-TO-AC CONVERTER WITH OUTPUT ISOLATION

[75] Inventors: Issa E. Batarseh, Oviedo, Fla.; Kasemsan Siri, Torrance, Calif.

[73] Assignee: University of Central Florida, Orlando, Fla.

[ * ] Notice: The term of this patent shall not extend beyond the expiration date of Pat. No. 5,434,767.

[21] Appl. No.: 502,084

[22] Filed: Jul. 14, 1995

Related U.S. Application Data

[63] Continuation-in-part of Ser. No. 179,348, Jan. 10, 1994, Pat. No. 5,434,767.
[51] Int. Cl.⁶ .............................. H02M 3/335; G05F 1/10
[52] U.S. Cl. .............................................. 363/16; 323/222
[58] Field of Search .............................. 363/16, 18, 20, 363/22, 24, 97, 131; 323/222, 259, 344

[56] References Cited

U.S. PATENT DOCUMENTS

| | | | |
|---|---|---|---|
| 4,866,367 | 9/1989 | Ridley et al. | 323/287 |
| 4,885,675 | 12/1989 | Henze et al. | 363/26 |
| 5,111,372 | 5/1992 | Kameyama et al. | 363/20 |
| 5,262,930 | 11/1993 | Hua et al. | 363/21 |
| 5,287,261 | 2/1994 | Ehsani | 323/222 |
| 5,434,767 | 7/1995 | Batarseh et al. | 363/16 |

Primary Examiner—Matthew V. Nguyen
Attorney, Agent, or Firm—James H. Beusse

[57] ABSTRACT

A modified DC-to-AC power converter accomplishes power transfer to a load with electrical isolation, zero-voltage and zero-current switching, using a transformer core resetting mechanism. The power converter contains two switching devices, a main device connected in parallel and a secondary device connected in series with a transformer primary winding. A secondary winding of the transformer is connected through a two-port resonant link circuit to a resistive load. Zero-voltage switching and proper transformer-core resetting are achieved from the resonance that exists between the parasitic capacitance of the secondary switching device and the magnetization inductance of the transformer. A transformer leakage inductance facilitates zero-current switching; thus, reducing the turn-on switching loss in the conventional main switching device. The switching converter contains a lossless clamping circuit, to limit the voltage stresses across both of the power switching devices to the reflected output voltage appearing across the primary.

11 Claims, 15 Drawing Sheets

VARIABLE FREQUENCY CONTROLLED ZERO-VOLTAGE SWITCHING SINGLE-ENDED CURRENT-FED DC-TO-AC CONVERTER WITH OUTPUT ISOLATION

CONTINUING DATA AS CLAIMED BY APPLICANT

This application is a continuation-in-part of U.S. patent application Ser. No. 08/179,348, filed Jan. 10, 1994, U.S. Pat. No. 5,434,767.

BACKGROUND OF THE INVENTION

This invention relates to power systems and more particularly to DC-to-AC switching power converters having reduced power consumption and reduced electromagnetic interference.

Due to the widespread use of switchmode power supplies, utility AC power systems have to deliver power to an increasing number of non-linear loads resulting in low power factor of the utility systems. These non-linear loads create significant electromagnetic interference in the harmonic currents drawn from the utility power buses. In addition to the unnecessary losses in power transmission due to the presence of these harmonic currents, the utility systems are polluted since conductive and radiated electromagnetic interference can propagate and degrade the performance of other sensitive electronic equipments or appliances sharing the same power bus.

Conventional approaches use passive line filters to attenuate these interferences. These approaches are no longer effective because bulky components are needed to absorb the harmonic currents and the fundamental component of the currents still have higher RMS value than necessary.

The preferred remedy for attenuating interference is active power factor correction in which switchmode converter topologies are utilized. A boost converter is the best topology for this application because it can be operated to draw continuous current with much less harmonics, resulting in ease of line-filtering and is more effective in the reduction of electromagnetic interference (EMI).

In the conventional DC boost converter topology, power transfer to the load is accomplished without electrical isolation from line to output since its output rectifier is a passive switch which cannot prevent a transformer inserted between the rectifier output and load circuit from saturating. The lack of electrical isolation makes it impossible to achieve a step-down output voltage in the single stage of power conversion.

Another type of boost converter configurations is the push-pull configuration. In the push-pull converter configurations, such as the converter described in U.S. Pat. No. 4,885,675, an isolation transformer is required to have two windings at the primary side and full-wave rectification at the secondary side so as to operate the transformer symmetrically without core saturation. However, the voltage stresses on the push-pull switching devices are twice the reflected output voltage at either side of the primary windings. Consequently, the push-pull boost converter will sacrifice more costly switching devices in order to achieve the same conduction losses yielded from the conventional boost converter. For example, a push-pull boost converter with nearly unity power factor used in a 200 volt AC system will require active switching devices having as high as 1000 volt breakdown voltage. The on-resistance of such switching devices is significantly high, causing more conduction losses. Further, a push-pull topology for DC-to-DC conversion requires at least three windings, two on the primary and one on the secondary.

SUMMARY OF THE INVENTION

This invention uses a modified single-ended boost converter circuit which is suitable for current shaping and EMI reduction applications due to its continuous input current. The inventive converter provides a step-up or step-down output voltage and provides electrical isolation using a transformer which requires only two transformer windings, i.e. one for a primary side and another for a secondary side.

The DC-to-AC boost converter topology draws continuous current and is suitable for EMI reduction. It is developed from the pulse width modulation (PWM) zero voltage switching (ZVS) boost-derived DC-to-DC converter shown in FIG. 1 by modifying the control circuit and the output power stage. This converter offers output isolation as well as stepped-up or stepped-down AC output voltage with only two transformer windings: primary and secondary windings. The converter employs variable switching frequency to control load power, and the output voltage and current produced are symmetrical and sinusoidal, resulting in low EMI radiation.

A main switching device is connected through a choke in parallel with the return terminal of the line voltage and one terminal of the transformer primary winding. An additional secondary switching device is connected in series with the other terminal of the transformer winding. The secondary side of the transformer is connected through an interface circuit to the load. The interface circuit comprises a two-port LCC resonant link circuit of one inductor and two capacitors.

An auxiliary switching circuit is described that consists of the additional active switching device in series with the primary winding of the transformer. By adding this auxiliary circuit across the main switching device, a modified boost converter is accomplished to provide step-up or down output voltage while achieving electrical isolation between the line and the output.

The additional active switch has parasitic capacitance across itself and this capacitance connects in series with the magnetization inductance of the primary winding. Due to the presence of parasitic capacitance across the additional active switch and magnetization inductance of the transformer primary winding, resonance occurs within the turn-off interval of the switch, thus facilitating zero-voltage switching. In the same manner, zero-voltage switching also occurs to the main switching device since parasitic capacitance across the device and the magnetization inductance form another resonant circuit within the turn-off interval of the device.

The switches are controlled by varying their pulse periods or frequency with complementary pulses that are provided at a duty ratio of 50%.

DESCRIPTION OF THE PREFERRED EMBODIMENTS

Figure 1:
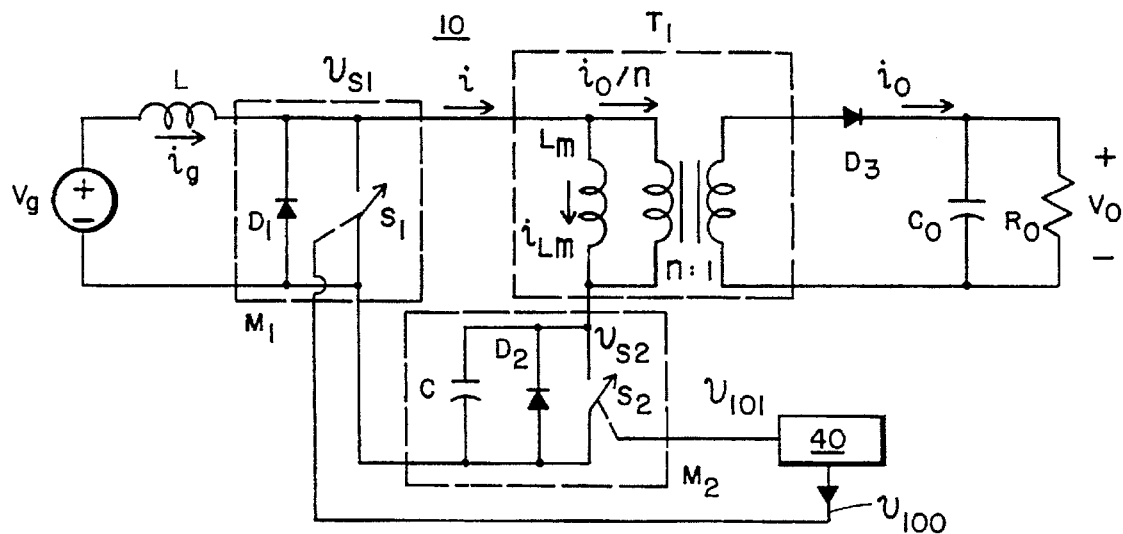
FIG. 1 is a schematic diagram of an ideal boost power DC converter circuit providing isolation and zero-voltage switching.

An ideal DC-to-DC converter possessing zero-voltage switching (ZVS) and output isolation is shown in FIG. 1 and designated as 10. Circuit 10 is connected between line or voltage source $V_g$ and load $R_o$. Converter 10 has a choke or inductor L connected at an input terminal to voltage source $V_g$ with the other terminal of the choke connected to main switching MOSFET $M_1$. MOSFET $M_1$ is represented by diode $D_1$ and switch $S_1$.

MOSFET $M_1$ is connected in parallel with the circuit consisting of source $V_g$ and the choke L connected in series and is connected to a terminal on a primary winding of transformer $T_1$. MOSFET $M_2$ is represented by switch $S_2$, capacitor C and diode $D_2$ that are connected in series with the primary winding of transformer $T_1$.

Output transformer $T_1$ has a magnetizing inductance designated as $L_m$ that appears across the primary winding. Capacitor C is preferably a parasitic junction capacitance of MOSFET $M_2$. A control circuit 40 is connected to switch MOSFET $M_1$ and MOSFET $M_2$. Control circuit 40 provides complementary pulses $v_{100}$ and $v_{101}$ to enable MOSFETS $M_1$ and disable MOSFET M2 or vice versa. Inductance $L_m$ and capacitor C form a series resonant circuit to permit switch $S_2$ to be turned on and off when the voltage vS2 across switch $S_2$ is zero volts.

Transformer $T_1$ has a turn ratio of n:1 and provides electrical isolation and energy transfer from the input choke L and the voltage source $V_g$ to the output circuit or rectifier 42. Circuit 42 consists of diode $D_3$ in series with a secondary of terminal $T_1$ and a filter capacitor C. Output circuit 42 is connected in parallel with the secondary of transformer $T_1$ to load $R_0$. The value of the reflected output capacitance seen from the primary is $C_0/n^2$ and is much larger than the resonant capacitor C.

In FIG. 1, i denotes the transformer primary current which has two components, a reflected load current ($i_0$/n) and a magnetization current $i_{Lm}$. However, only current $i_{L_m}$ contributes linearly to the magnetic flux stored in the transformer core. MOSFETS $M_1$ and $M_2$ are enabled and disabled so that a resonant phenomenon occurs in the converter circuit 10 to provide polarity reversal of $i_{L_m}$ within every switching period. Effectively, this polarity reversal causes the magnetic flux density in transformer $T_1$ to reset and to swing within the linear region of the transformer core characteristics.

Figure 2:
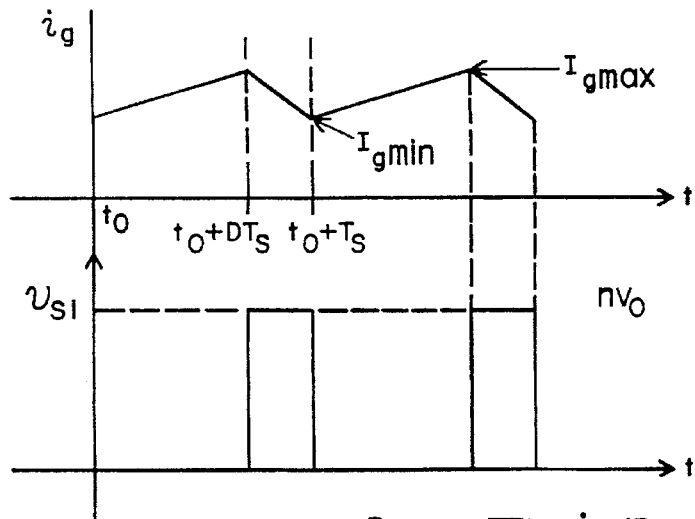
FIG. 2 are diagrams of waveforms of input choke current $i_g$ and voltage drop across $S_1$ of the circuit shown in FIG. 1.

Assuming that the circuit 10 is operating in steady state and in the continuous conduction mode ($i_g(t)>0$ at all times), waveforms of the converter input choke current ($i_g$) and the voltage across switch $S_1$ ($v_{s1}$) are shown in FIG. 2. Referring to FIG. 2, at time $t_0$, switch $S_1$ is turned on and $S_2$ turned off by circuit 40, causing $i_g$ to increase linearly in time and $v_{s1}$ being held at zero voltage. At time $t_0+DT_s$, circuit 40 turns off switch $S_1$ while switch $S_2$ is turned on a little before time $t_0+DT_s$ to keep current $i_g$ flowing smoothly through the primary winding of transformer $T_1$ thus avoiding a large voltage spike. At time, $t_0+DT_s$, the voltage $v_{s1}$ transits from zero to $nv_0$, i.e. the reflected output voltage across the primary winding. Voltage $v_{s1}$ remains at $nv_0$ until time $t_0+T_s$ when circuit 40 again turns on and off switch $S_1$ and $S_2$, respectively. Circuit 40 maintains a small overlapping on-time between switches $S_1$ and $S_2$ to ensure current is maintains its continuity and deterministic slopes during switching transitions of both switches $S_1$ and $S_2$.

Figure 3:
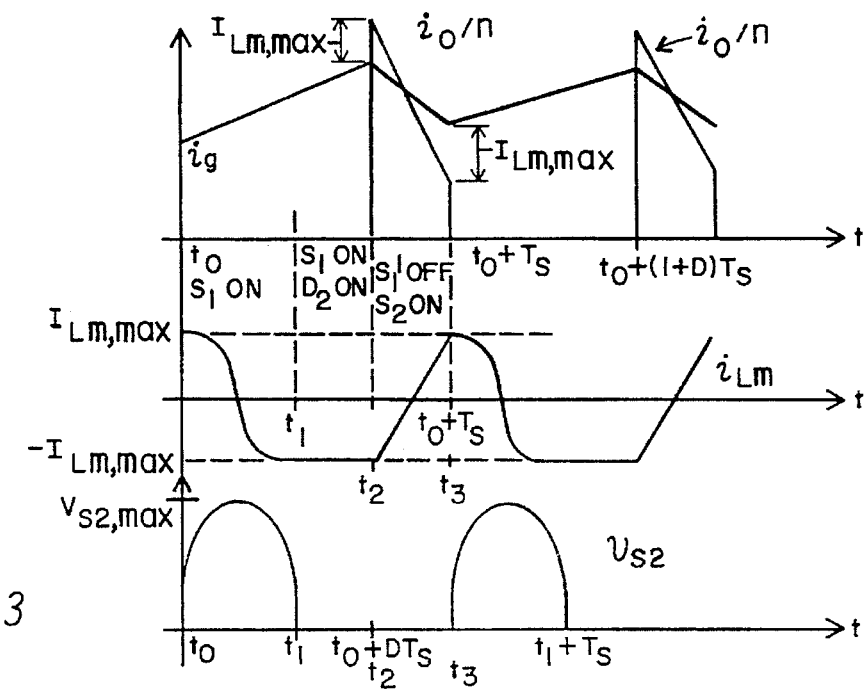
FIG. 3 are diagrams of waveforms of input choke current $(i_g)$, reflected load current $(i_o/n)$, magnetization current $(i_{L_m})$ and voltage across $S_2$ $(v_{s_2})$ of the circuit shown in FIG. 1.

In FIG. 3, there is shown a more detailed waveform regarding the magnetization and the reflected-load currents ($i_{L_m}$ and $i_o/n$) in comparison with the input choke current ($i_g$) during converter 10 operation. In addition, the waveform of the voltage across switch $S_2$ (designated as $v_{s2}$) is shown to remain at zero from time $t_1$ until switch $S_2$ is turned on at time $t_0+DT_s$ to achieve zero-voltage switching.

During time $t_0+DT_s \leq t_0+T_s$, the majority of current $i_g$ contributes to the power transfer from the primary to the secondary side of the transformer $T_1$ which provides the DC power to the load circuit $R_0$. A small portion of current $i_g$ contributes to the magnetic energy stored in the transformer core, which is represented by the magnetization current $i_{L_m}$. During this time interval $i_{L_m}$ is increasing even though current $i_g$ is decreasing. Because a majority of current $i_g$ causes diode $D_3$ to remain forward-biased which results in a voltage $nV_0$ appearing across inductance $L_m$. The magnetization current $i_{Lm}$ increases linearly from a negative value to zero and then to a maximum positive value at time $t_0+T_s$.

At time $t_0+T_s$ (or $t_0$) diode $D_3$ is forced to turn-off circuit 40 enabling switch $S_1$ and disabling $S_2$ resulting in current $i_{L_M}$ reaching its maximum value designated as $i_{L_m,max}$. From time $t_0+T_s$ to time $t_1+T_s$ (or $t_0$ to $t_1$), inductor $L_m$ and capacitor C form a resonant circuit loop due to the conduction of switch $S_1$. As can be seen from the waveforms shown in FIG. 3, current $i_{Lm}$ decreases sinusoidally from its positive maximum ($I_{Lm,max}$), crosses zero and approaches its negative minimum ($-I_{Lm,max}$), while voltage across $C(v_{s2})$ completes its positive half of a sine wave at time $t_1+T_s$ (or $t_1$). At time $t_1+T_s$ (or $t_1$), antiparallel diode $D_2$ across capacitor C becomes forward-biased due to the negative current ($-I_{Lm,max}$) attempting to charge capacitor C in the opposite direction. Assuming that diode $D_2$ is ideal, the voltage across capacitor C is clamped to zero and causing zero voltage drop across inductor $L_m$. Consequently, current $i_{L_m}$ remains at its negative minimum ($-I_{Lm,max}$) until switches $S_1$ and $S_2$ are turned off and turned on, respectively, at time $t_0+(1+D)T_s$ (or $t_2=t_0+DT_s$).

Figure 4:
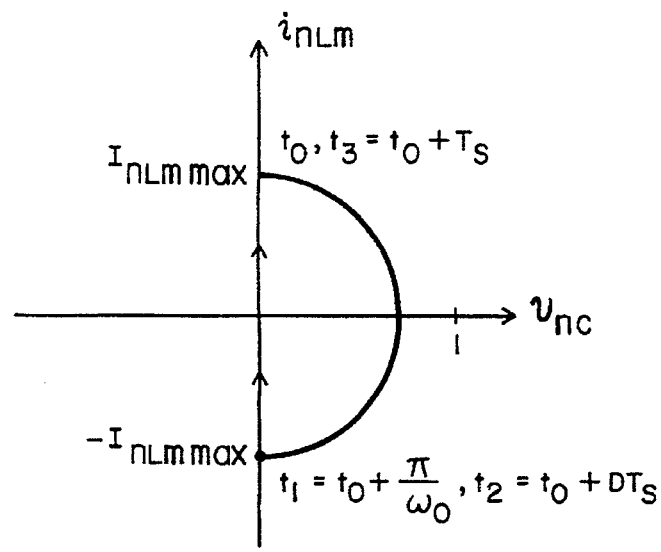
FIG. 4 is normalized trajectory of magnetization current and capacitor voltage of the circuit shown in FIG. 1.

From the waveforms of current $i_{L_m}$ and voltage $v_{s2}$ (or $v_c$ for simplicity) shown in FIG. 3, their normalized trajectory $$\left( \frac{i_{L_m} z_0}{nV_0} \text{ versus } \frac{v_c}{nV_0} \right)$$

can be constructed as shown in FIG. 4. The following quantities are defined for convenience:

$$z_0 = \sqrt{\frac{L_m}{C}}$$

$$\omega_0 = \frac{1}{\sqrt{L_m C}}$$

The resonant period $T_o$ must be properly determined to ensure that sufficient time is provided to reset the magnetic core in a resonant fashion. From the waveforms of current $i_{L_m}$ and voltage $v_{s2}$ (or $v_c$) shown in FIG. 3, $T_o/2$ is the time spent in resetting current $i_{L_M}$ from $I_{L_m,max}$ to $-I_{L_m,max}$, which is equal to one half of the resonant period. This resetting time must be less than the time for turning-on of switch $S_1$ ($DT_s$). This condition can be expressed as $$\frac{T_0}{2} \leq DT_S \tag{1}$$

If we define the normalized switching frequency, $$\omega_{ns} = \frac{f_s}{f_0} = \frac{T_0}{T_S} \tag{2}$$

Equation (1) can be rewritten as $$\omega_{ns} \leq 2D \tag{3}$$

Figure 5:
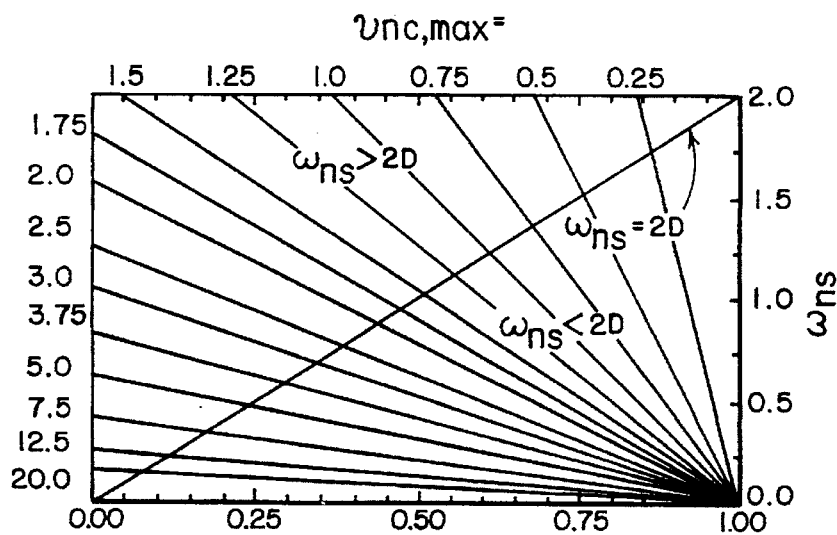
FIG. 5 are characteristics of ideal ZVS boost converter of the circuit shown in FIG. 1.

Equation (3) is characterized by the lower right triangular area shown in FIG. 5. If the selected $\omega_{ns}$ and D pair is located within the triangular area, the core-reset mechanism as well as zero-voltage switching of voltage $v_{s2}$ can be achieved successfully without saturating the core of transformer $T_1$. To facilitate the selection of switching of switching device $S_2$ with proper voltage ratings, one needs to characterize the relative voltage stress ($V_{s2,max}/nV_o$), From the current $i_{L_m}$ waveform depicted in FIG. 3, the change in the magnetization current when switch $S_2$ is on from time $t_0+DT_s$ to time $t_0+T_s$ is $2I_{Lm,max}$. Therefore, we can write $$I_{Lm,max} = \frac{i_{Lm}(t_0+T_S) - i_{Lm}(t_0+DT_S)}{2} \tag{4}$$

$$= \frac{1}{2} \frac{nV_0}{L_m} (1-D)T_S$$

In terms of normalized quantity, (4) can be rewritten as $$I_{nLm,max} = z_0 \frac{I_{Lm,max}}{nV_0} = \frac{1}{2} (1-D)T_S \frac{z_0}{L_m}$$

or $$I_{nLm,max} = \frac{1}{2}(1-D)T_s \omega_0 \tag{5}$$

From the state-trajectory shown in FIG. 4, the normalized capacitor voltage of capacitor C, $$v_{nC} = \frac{v_{s2}}{nV_0}$$

is maximum when current $i_{nLm}$ reaches zero. Since the center of the circular trajectory is at the origin, we have the following expression:

$$V_{nC,max} = I_{nLm,max} = \frac{1}{2}(1-D)T_s \omega_o \tag{6}$$

From eq. (2) and $\omega_o=2\pi f_o$, Eq. (6) can be rewritten as $$\omega_{ns} = \frac{(1-D)\pi}{v_{nC,max}} \quad (7)$$

From (7), relationship of $\omega_{ns}$ versus D can be plotted for several values of $v_{nC,max}$ as shown in FIG. 5. The design curves shown in FIG. 5 aid in finding a maximum $\omega_{ns}$ that will yield the minimum voltage stress $v_{nC,max}$ an assigned duty ratio. Alternately, given a duty ratio, equations (3) and (6) may be solved to give values of $\omega_{ns}$ and $V_{nC,max}$ that can then be used to calculate the values for inductor L and capacitor C.

Zero-voltage-switching for both switches $S_1$ and $S_2$ is achieved if the increasing rate of the magnetization current is faster than the decreasing rate of the input choke current $i_g$ shown in FIG. 1. This can be accomplished at either under light load conditioned or by decreasing the magnetization inductance.

During the recovery time of the output rectifier 42, its recovery current will contribute to the fast increasing of the magnetization current and the slow decreasing of the input choke current through the conducted switch $S_2$. When the recovery current vanishes, the magnetization current will have already reached its positive maximum while the input choke L will have reached its negative minimum.

After the output diode rectifier $D_3$ is in a blocking state, the magnetization current will circulate through diode $D_1$ and switch $S_2$. During this time, the magnetization current latches at its positive maximum and the input choke L current increases. The diode $D_1$ remains conductive as long as the magnetization current is greater than the input choke current, thus providing zero-voltage switching for switch $S_1$. Sacrificing recovery loss, zero-voltage switching is achieved for both switches $S_1$ and $S_2$ in this manner.

Figure 6:
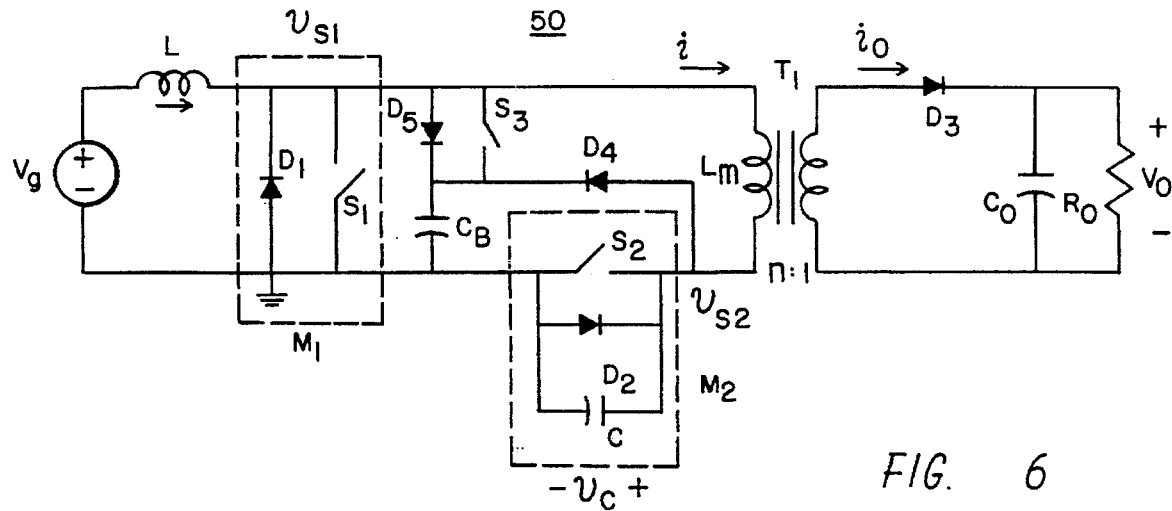
FIG. 6 is a schematic diagram of another proposed power converter circuit with zero voltage switching, near-lossless clamping circuit and output voltage isolation.

Another proposed circuit of the zero-voltage switching boost converter with isolation is shown in FIG. 6 and designated generally as circuit 50. Circuit 50 includes the series combination of the voltage source $V_g$ and inductor L connected in parallel with MOSFET $M_1$ to transformer $T_1$ primary winding. Circuit 50 also includes the MOSFET $M_2$ connected in series between transformer $T_1$ primary winding and a common terminal of voltage source $V_g$ and operates as previously described in FIG. 1. The secondary of transformer $T_1$ is connected to output rectifier 42.

A diode $D_5$ is connected in series with capacitor $C_B$ across MOSFET $M_1$. A switch $S_3$ is connected in series with diode a $D_4$ across the transformer T1 primary with a junction intermediate diode $D_4$ and switch $S_3$ connected to a junction intermediate diode $D_5$ and capacitor $C_B$.

Switches $S_1$ and $S_2$ are operated in a complementary fashion by controller 40. Diode$_4$, switch $S_3$, diode $D_5$ and capacitor $C_B$ form an almost lossless snubber circuit that is used to suppress or clamp the switching transient voltages across $S_1$ and $S_2$. By selecting a proper value for capacitor $C_B$, the current rating of switch $S_3$ can be made much smaller as compared to the size and current ratings of power switches $S_1$ and $S_2$.

Capacitor C is a parasitic component across the switching MOSFET $S_2$ which has very small capacitance as compared to capacitance of capacitor $C_B$. Inductance $L_m$ is the magnetization inductance appearing at the transformer $T_1$ primary. Inductance $L_m$ and capacitor C form a resonant tank circuit which makes zero-voltage switching possible. Transformer $T_1$ provides electrical isolation and energy transfer from the input choke L and the voltage source $V_g$ to the output circuit or rectifier 42 which consists of diode $D_3$, capacitor $C_o$ and load resistor $R_o$. The reflected output capacitance $C_o n^2$ is much larger than snubber the capacitance $C_B$.

In practice, to assure that the input choke L is never open circuited, both of the switches $S_1$ and $S_2$ should have a small amount of overlap in their on-times. When $S_1$ is off, $S_2$ and $S_3$ are turned on. The on-state of $S_2$ allows the energy transfer from the input circuit (L and $V_g$) to the output circuit via transformer $T_1$. Switch $S_3$ is turned on (within the turn-off interval of $S_1$) by controller to regulate the voltage across the snubber capacitor $C_B$ to the reflected output voltage across the primary winding of transformer $T_1$. When the circuit responses reach their steady states, the voltage across capacitor $C_B$ settles at $nV_0$.

The minimum duty ratio that allows just sufficient core-resetting mechanism is determined by the magnetization current $i_{Lm}$ and the voltage across $S_1$ and $S_2$ ($V_{s1}$ and $V_{s2}$, respectively). From FIG. 6, i denotes the transformer primary current which has two components: the reflected load current $i_o/n$ and the magnetization current $i_{Lm}$. To analyze the response due to the magnetization current that only contributes to the magnetic flux in the transformer core, the reflected load current has been excluded from current i. Hence, the waveform of current $i_{Lm}$ to be shown will proportionally represent the magnetic flux accumulated in the core. Typical normalized waveforms of voltage $V_{nC}$ and current $i_{Lm}$ are shown in FIG. 7.

Figure 7:
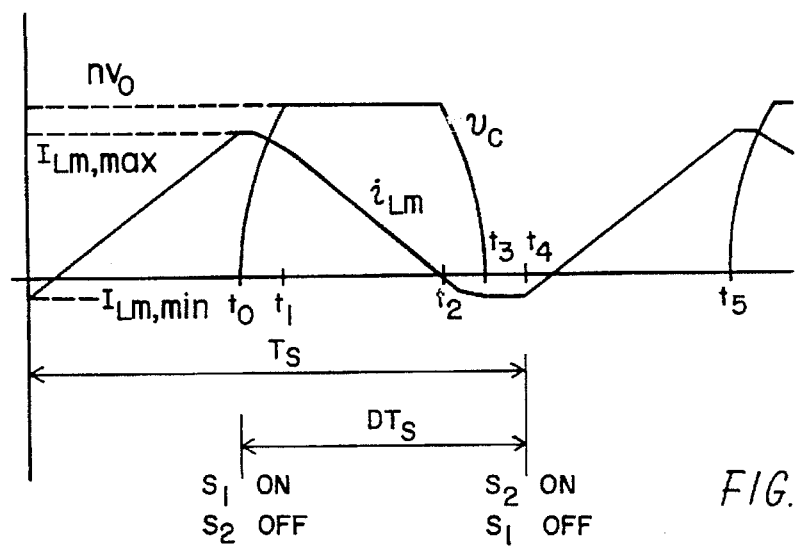
FIG. 7 is a diagram of a waveform for $i_{Lm}$ and $v_c$ of the circuit shown in FIG. 6.

Referring to FIG. 7, at time $t=t_0$, $S_2$ is turned off in a very short time after turning on of switch $S_1$, resulting in the magnetization current $i_{Lm}$ to resonantly decreasing from $I_{Lm\ max}$ while the input choke current is linearly increasing through switch $S_1$. Current $i_{Lm}$ charges capacitor C and causes $v_c$ to resonantly increase. At time $t=t_1$, $v_{c26}$ is clamped to the voltage across capacitor $C_B$ which is equal to $nV_0$ by the forward bias of diode $D_4$. From this time, $i_{Lm}$ decreases linearly.

At time $t=t_2$, current $i_{Lm}$ reaches zero and diode $D_4$ is naturally turned off, resulting in the resonant discharge of capacitor C through the magnetization inductance $L_m$ and $S_1$. During this time, current $i_{Lm}$ becomes negative. When voltage $v_c$ decreases to zero at time $t=t_3$, the negative magnetization current will cause diode $D_2$ to conduct and current $i_{Lm}$ is latched at $I_{Lm,min}$ through diode $D_2$ and switch $S_1$. Voltage $v_c$ remains at zero during this time. The sustained conduction of diode $D_2$ allows switch $S_2$ to be turned on at zero-voltage. Later, switch $S_1$ is turned off at time $t=t_4$ while switch $S_2$ has just been turned on. From this time, voltage across switch $S_1$, $v_{s1}$, is first clamped to the voltage across capacitor $C_B$ and then clamped to the reflected output voltage $nV_0$. Without capacitor $C_B$ and diode $D_5$, $v_{s1}$ could have high frequency ringing transients due to the resonance between the parasitic capacitance across switch S1 and the leakage inductance of the transformer.

From time $t_4$ to $t_5$, current $i_{Lm}$ linearly increases from $I_{Lm,min}$ to $I_{Lm\ max}$. Within this time interval, switch $S_3$ is turned on to discharge the excess voltage across capacitor $C_B$ to the output circuit via transformer $T_1$. Thus, capacitor $C_B$ never has its voltage run away. At time $t=t_5$, $S_1$ is turned on to complete one switching cycle.

To reset the transformer core properly, the circuit 50 must operate at a duty ratio above some minimum duty ratio, $D_{min}$. For the sake of convenience, the voltage is normalized $v_0$ by $nV_0$ and the current $i_{Lm}$ is normalized by $(nV_0)/Z_0$ where $Z_0=\sqrt{L_m/C}$.

Figure 8:
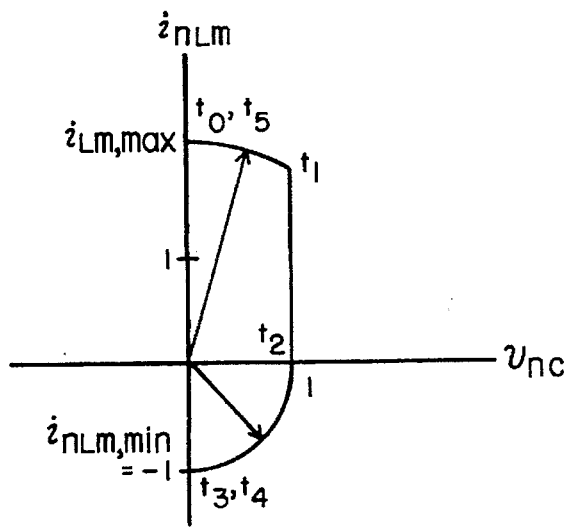
FIG. 8 is a state plane diagram of $i_{Lm}$ vs. $V_c$ for $i_{nLmax} > 1$ of the circuit shown in FIG. 6.

The trajectory of the normalized current $L_{nLm}$ versus the normalized voltage $v_{nC}$ are depicted in FIG. 8. Utilizing the geometry of this trajectory, two cases are analyzed to determine the minimum duty ratio $D_{min}$.

In the case where $i_{nLm,max}>1$, to operate the transformer core without magnetic saturation, the average voltage across the transformer primary winding must be zero over a switching period. Mathematically, this constraint may be written as, $$-\frac{1}{T_S}\left[\int_{t_0}^{t_S} v_{S1}dt - \int_{t_0}^{t_S} v_c dt\right] = \bar{v}_{S1} - \bar{v}_C = 0 \quad (8)$$

where $V_{s1}$ is the voltage across switch $S_1$, $v_c$ is the voltage across switch $S_2$ and capacitor C(see FIG. 6) and the over-bar denotes average value of the variables. Since the average voltage over a switching period across an inductor is zero, the volt-second balance across the input choke L yields $$\bar{V}_{S1} = (1-D)nV_0 \quad (9)$$

Utilizing the waveforms shown in FIG. 7 and the state plane trajectory in FIG. 8, it can be shown that $$\omega_0 T_S D_{min} = \sin^{-1}\left(\frac{1}{\omega_0 T_S(1-D_{min})-1}\right) + \quad (10)$$

$$\sqrt{(\omega_0 T_S(1-D_{min})-1)^2 - 1} + \frac{\pi}{2}$$

for $f_{ns} < 2\pi/(2+\pi)$

Equation (10) is derived from the following relations: When $i_{nLm,max}$ approaches unity, the following limiting values are obtained $$\lim_{i_{nL,max}\to 1} D_{min} = \lim_{i_{nL,max}\to 1} \frac{f_{nS}}{2} = \frac{\pi}{2+\pi}, \text{ and}$$

$$f_{ns} = \frac{2\pi}{2+\pi}\bigg|_{i_{nL,max}\to 1} \quad (11)$$

The following expressions are derived:

$$D_{min} = \frac{t_{01} + t_{12} + t_{23}}{T_s}$$

$$i_{nL_{max}} - i_{nL_{min}} = i_{nL_{max}} + 1 = \omega_o T_s(1-D_{min})$$

$$t_{01} = \frac{\sin^{-1}\frac{1}{i_{nL_{max}}}}{\omega_0}$$

$$t_{12} = \frac{i_{nL_{max}}}{\omega_0}\cos\omega_0 t_{01}$$

$$t_{23} = \frac{\pi}{2\omega_0}$$

where $f_{ns} = 2\pi/\omega_0 T_s$.

In the case where $i_{nLm,max} \leq 1$, the trajectory of voltage $v_{nC}$ and current $i_{nLm}$ is shown in FIG. 4. Using the geometry of this trajectory, the minimum duty ratio can be expressed as $$D_{min} = \frac{t_{01}}{T_S} = \frac{T_0}{2T_S} = \frac{f_{ns}}{2} \quad (12)$$

for $f_{ns} > 2\pi/(2+\pi)$. Expressions for $D_{min}$ given by (10) and (12) are plotted versus the normalized switching frequency in FIG. 10 where the top line denotes our case (n=1).

Figure 9:
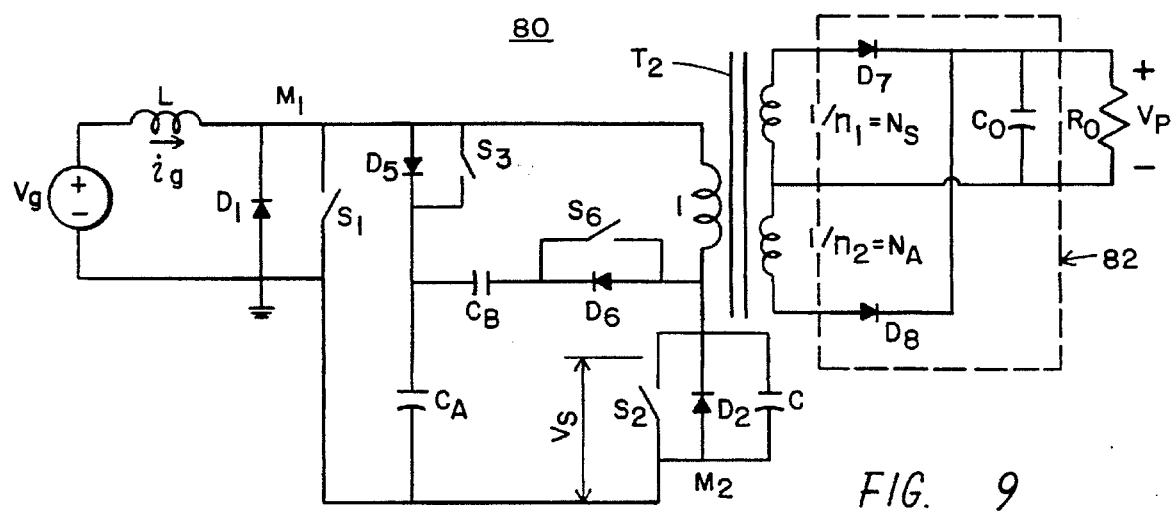
FIG. 9 is a schematic diagram of another proposed circuit with isolation and extended operational duty ratio.

FIG. 9 shows another modified version of the basic converter circuit that was introduced in FIG. 6 and is designated as 80. Circuit 80 includes inductor L connected in parallel with MOSFET $M_1$ to transformer $T_2$. Circuit 80 also includes MOSFET $M_2$ connected in series between the primary winding of transformer $T_2$ and the common terminal of voltage source $V_g$. MOSFET $M_1$ and MOSFET $M_2$ are represented by components as previously described in FIG. 1.

Diode $D_5$, connected in parallel with switch $S_3$, represents a MOSFET $M_3$ connected in series with a capacitor $C_A$ across MOSFET $M_1$. The parallel combination of switch $S_6$ and diode $D_6$, representing MOSFET $M_6$, is connected from one terminal of the primary winding of transformer $T_2$ to a capacitor $C_B$. The other terminal of capacitor CB is connected to the junction of capacitor $C_A$ and switch $S_3$. Output rectifier circuit 82 is connected to the secondary of transformer $T_2$. Rectifier circuit 82 includes diodes $D_7$ and $D_8$ connected in a full wave rectifier configuration with capacitor $C_o$ and load $R_o$. The full wave rectification requires a tapped secondary winding of transformer $T_2$. The main power transfer is accomplished by the conduction of diode $D_7$.

Figure 10:
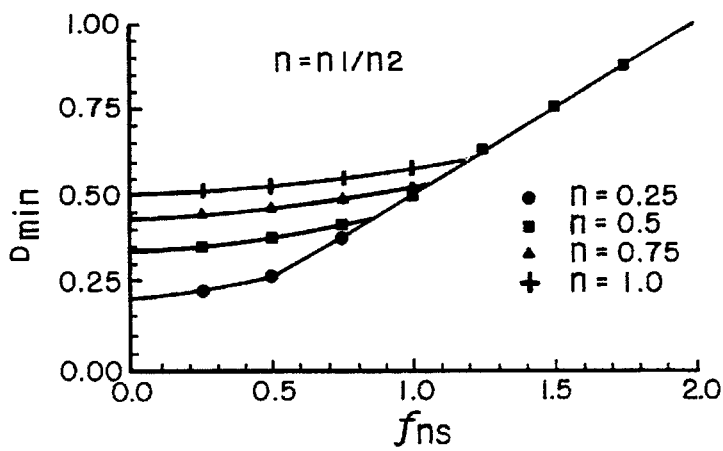
FIG. 10 are graphs displaying characteristic of $D_{min}$ vs. $f_{ns}$ for n=1.0, 0.75, 0.5, 0.25 of the circuit shown in FIG. 9.

Modified circuit 80 utilizes a transformer $T_2$ having an auxiliary winding $N_A$ having a fewer number of turns than the secondary winding $N_S$. As a result the turn ratio $N_A:N_S = n_1:n_2$ is less than unity to extend the minimum operational duty ratio below 0.5. Note that $n_1$ is the turn ratio from the primary to the secondary winding, and $n_2$ is the turn ratio from the primary to the auxiliary winding. Switches $S_6$ and $S_2$ are controlled with complementary driving signals and, in practice, should not have an overlap on-time between them. However, to achieve zero-voltage switching across switch $S_2$, $S_6$ must be turned off at least $T_0/4$ seconds before $S_2$ turns on, where $T_o$ is the resonant period forming by $L_m$ and C. Switches $S_2$ and $S_1$ are also driven by complementary signals but they should have overlapping conduction times. Switch $S_6$ limits the voltage across capacitor $C_B$ such that it does not deviate from $(n_2V_0-n_1V_0)$ while switch $S_3$ limits the voltage level across capacitor $C_A$ not exceeding above $n_1V_0$ volts. As usual, capacitors $C_B$ and $C_A$ are assumed to be much larger than capacitance C, the parasitic capacitance of $S_2$. We can calculate the minimum duty ratio $D_{min}$, given by the following equation for $i_{nL,max} > 1$:

$$\omega_0 T_S D_{min} = \sin^{-1}\left[\frac{1}{\frac{n1}{n2}\omega_0 T_S(1-D_{min})-1}\right] + \quad (13)$$

$$\sqrt{\left(\frac{n1}{n2}\omega_0 T_S(1-D_{min})-1\right)^2 - 1} + \frac{\pi}{2}$$

for $f_{ns} < \left(\frac{2}{\frac{2}{\pi(n_1/n_2)}+1}\right)$ and for $i_{nL,max} < 1$ $$D_{min} = \frac{f_{nS}}{2}, \text{ for } f_{ns} > \frac{2}{\frac{2}{\pi(n_1/n_2)}+1} \quad (14)$$

where and $i_{nL}=i_L Z_0/(n_1 v_0)$ and $V_{nC}=V_c/(n_1 V_0)$. Using the expressions given by (13) and (14), we can plot the characteristic curves for $D_{min}$ versus $f_{ns}$. FIG. 10 shows these characteristics for $n_r=1.0$, 0.75, 0.5, 0.25, where $n=n_1/n_2$.

Figure 11:
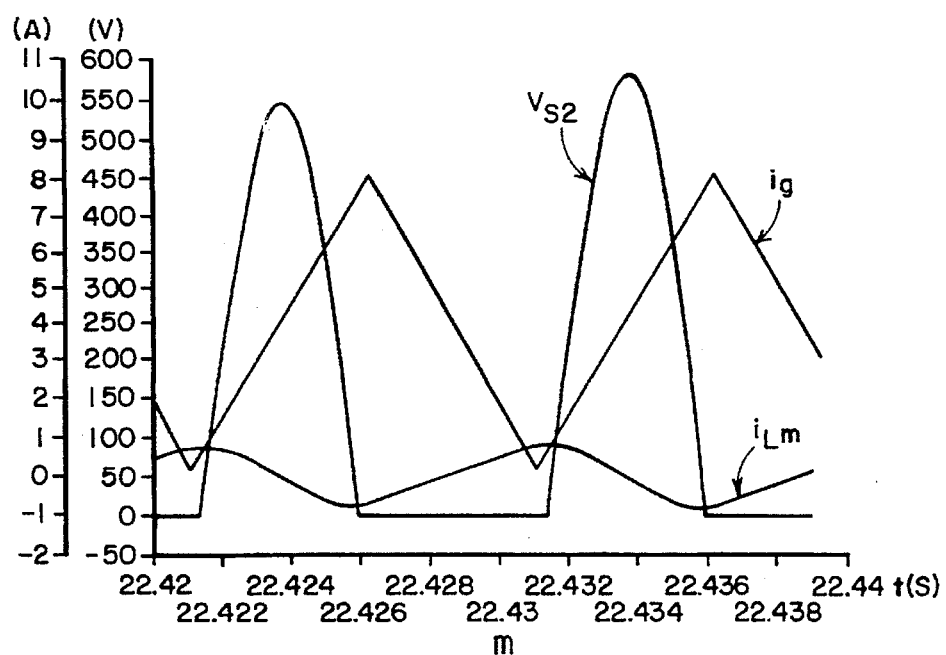
FIG. 11 are diagrams of simulation results for $v_{s2}$, $i_g$ and $i_{Lm}$ for duty ratio 0.5 of the circuit shown in FIG. 9.
Figure 12:
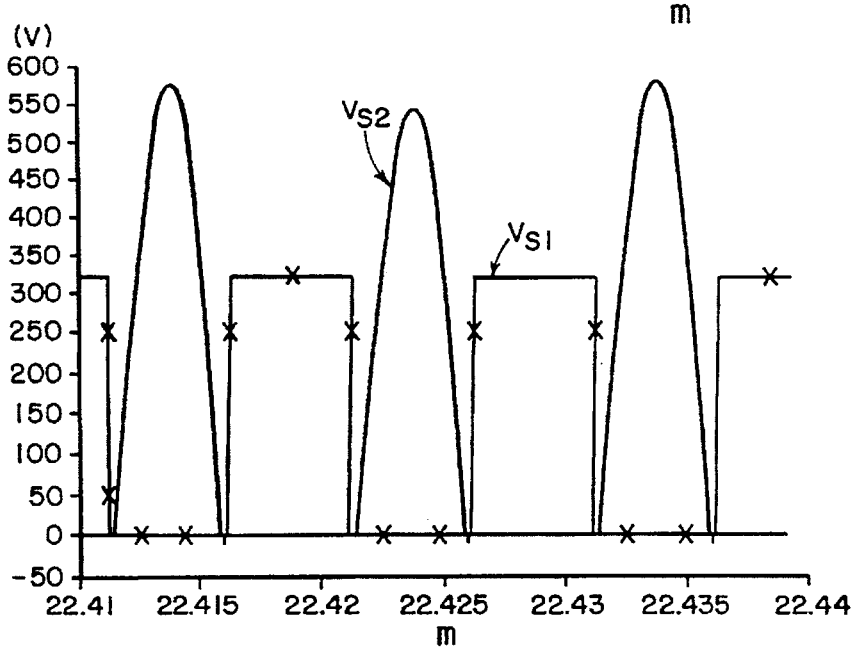
FIG. 12 are diagrams of simulation results for $v_{s1}$ and $v_{s2}$ for duty ratio 0.5 of the circuit shown in FIG. 9.
Figure 13:
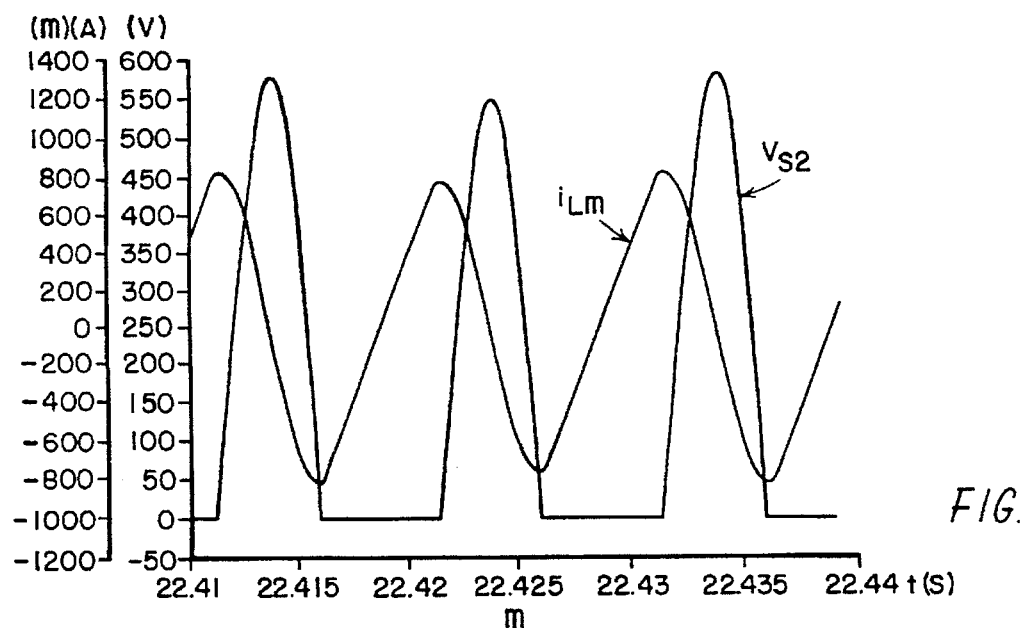
FIG. 13 are diagrams of simulation results for $i_{Lm}$ and $v_{s2}$ for duty ratio 0.5 of the circuit shown in FIG. 9.

The converter shown in FIG. 1 was simulated at the duty ratio of 0.5 and 0.9 respectively. The following component values were used in the simulation:
Input voltage, $V_g$=160 V
Input choke, L=100 uH
Parasitic capacitance, C=800pF
Transformer turns ratio, $n_p:n_s$=1:1
Transformer magnetization inductance, $L_m$=1 mH
Load resistance, $R_o$ =160 ohm
Output filter capacitance, $C_o$=100 uF
Switching frequency, $f_s$=100 kHz FIGS. 11, 12 and 13 show the simulation results of the converter responses for the duty ratio of 0.5. FIG. 11 provides the voltage across switch $S_2 (v_{s2})$, the input choke and the magnetization currents ($i_g$ and $i_{Lm}$). The figure indicates that the converter is operated in the continuous conduction mode.

In FIG. 12, there is shown the voltages across switches $S_1$ and $S_2$ ($v_{s1}$ and $v_{s2}$). In this figure, voltage $v_{s1}$ and $v_{s2}$ have the overlap on-time which can be observed from the overlapping time-intervals of zero voltage of the both switches. Additionally, zero voltage switching of switch $S_2$ can be verified from this figure.

In FIG. 13 there is shown a more detailed waveform of the magnetization current ($i_{Lm}$) with voltage $v_{s2}$ as the reference waveform. Current $i_{Lm}$ swings between −800 and 800 mA and the shape of its waveform is in agreement with the theoretical waveform. The steady-state output voltage, which is not shown here, settles at 320.6 volts as expected.

Figure 14:
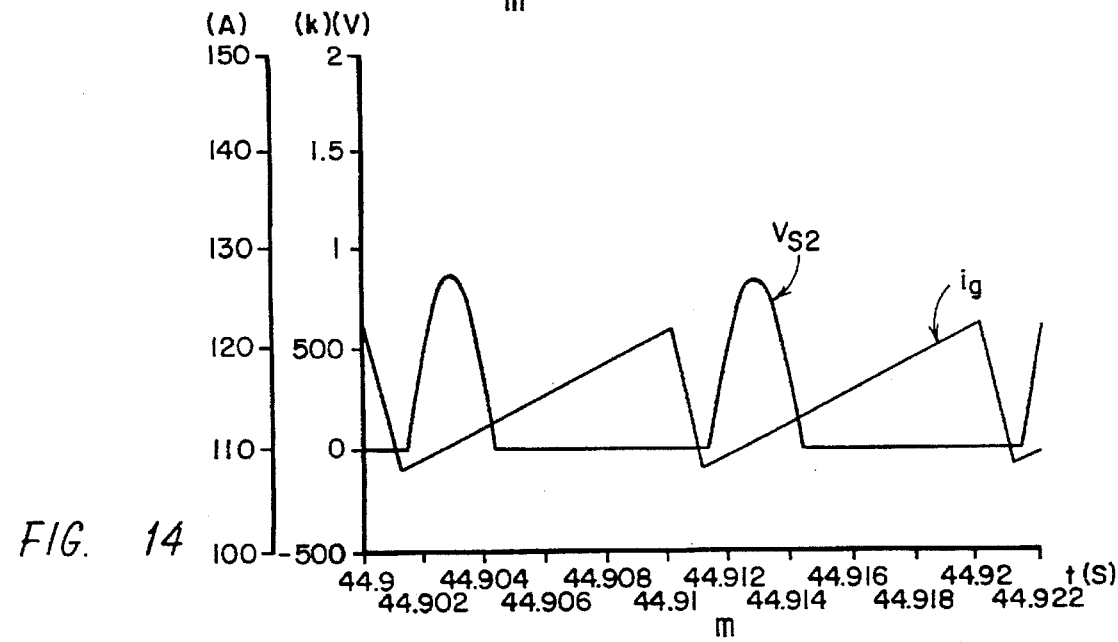
FIG. 14 are diagrams of simulation results for $i_g$ and $v_{s2}$ for duty ration 0.9 of the circuit shown in FIG. 9.
Figure 15:
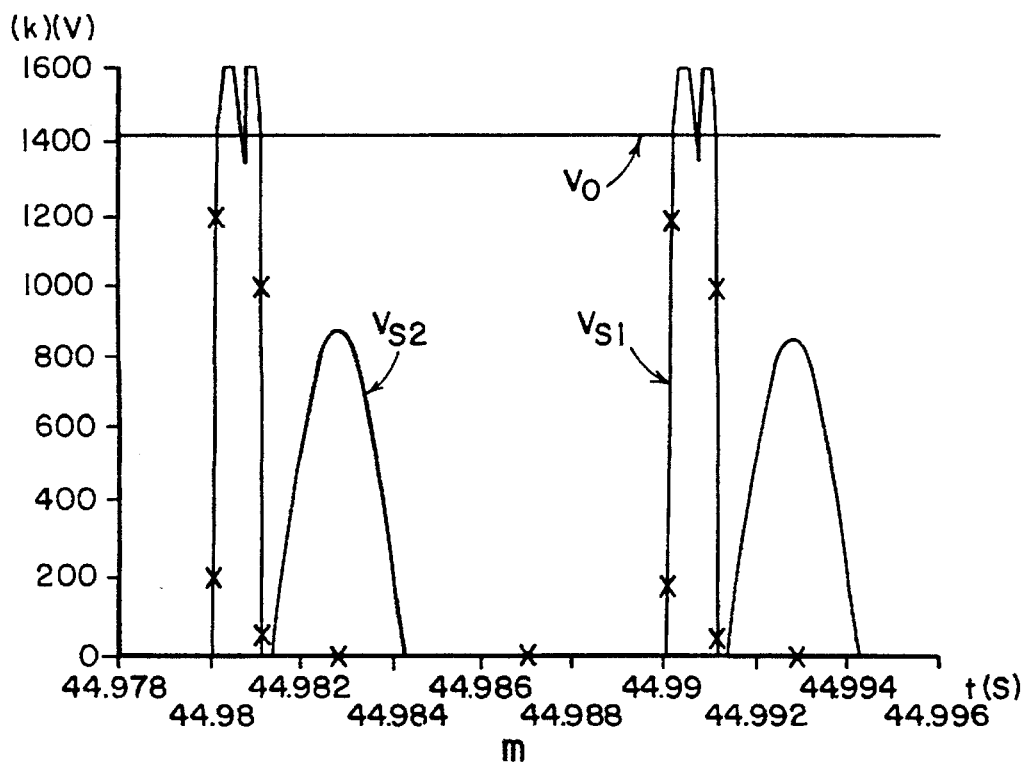
FIG. 15 are diagrams of simulation results for $v_{s1}$ $v_{s2}$ and $v_0$ for duty ratio 0.9 of the circuit shown in FIG. 9.
Figure 16:
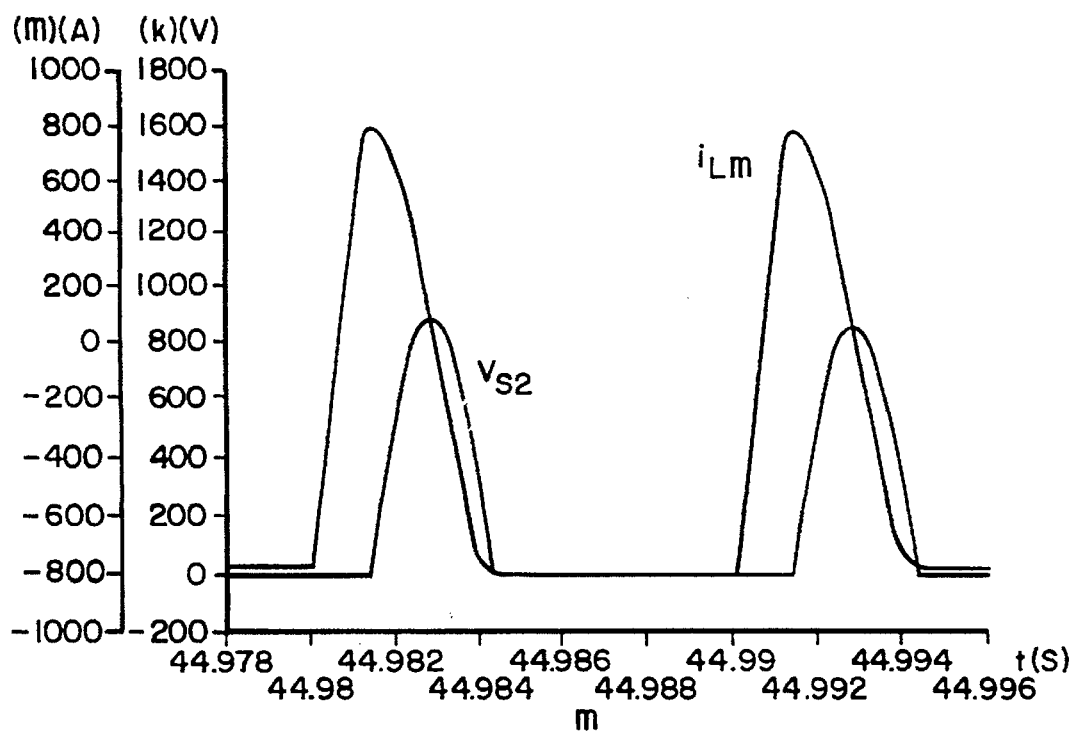
FIG. 16 are diagrams of simulation results for $i_{Lm}$ and $v_{s2}$ for duty ratio 0.9 of the circuit shown in FIG. 9.

In FIGS. 14, 15 and 16 there is shown the simulation results of the converter responses for the duty ratio of 0.9. FIG. 14 gives the waveforms of $v_{s2}$ and $i_g$. The average current for $i_g$ is approximately 115 amps.

In FIG. 15 there is shown voltage $v_{s1}$ and $v_{s2}$. Again, the zero-voltage switching of switch $S_2$ is confirmed when $v_{s2}$ has its zero voltage before $S_2$ is turned on (or $S_1$ is turned off).

Finally, in FIG. 16 there is shown current $i_{Lm}$ and voltage $v_{s2}$. Similarly, current $i_{Lm}$ swings between −800 and 800 mA and has its waveform very close to the ideal waveform predicted from the theory.

Figure 17:
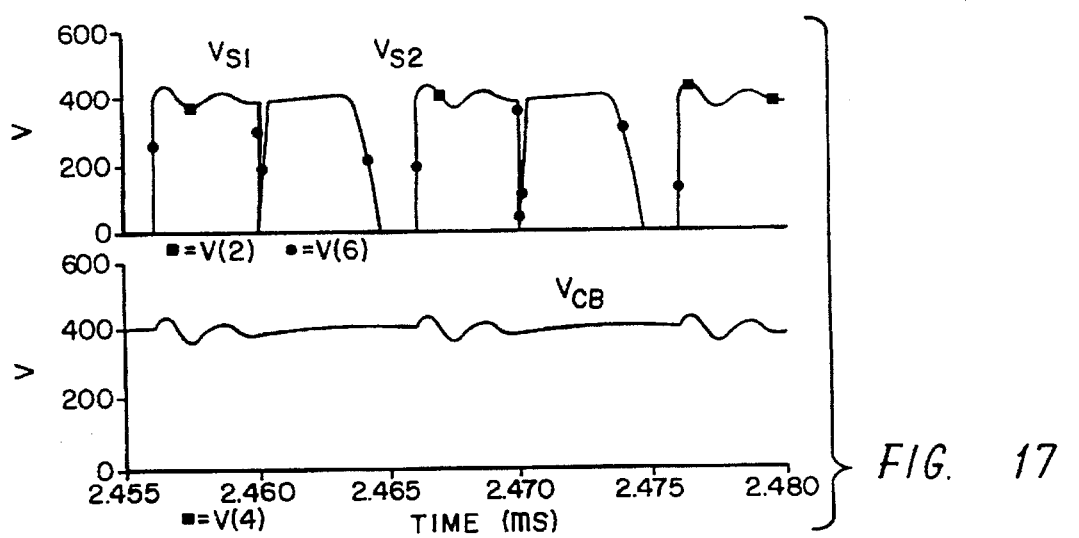
FIG. 17 are diagrams of preliminary results from the PSPICE simulation of the circuit shown in FIG. 6.

A computer simulation of the circuit shown in FIG. 6 was carried out at 1 kW output load to demonstrate the zero-voltage switching capability of the converter. The following are the component values used in the simulation.
Input voltage, $V_q$=160 V
Input choke, L=100 μH
Parasitic capacitance, C=800 pF
Snubber capacitance, $C_B$=0.1 μF
Transformer turns ratio, $n_p:n_s$=1:1
Transformer coupling coefficient, $k_p$=0.999999
Transformer primary leakage inductance, $L_{1p}$=1 μH
Transformer magnetizing inductance, $L_m$=1 mH
Load resistance, $R_o$=160 Ω
Output filter capacitance, $C_o$=10 μF
Duty ratio, D=0.6
Switching frequency, $f_s$=100 kHz In FIG. 17 there is shown the preliminary simulation results of the voltage across snubber capacitor $C_8$ ($v_{CB}$ in the lower plot) and the voltages across switches $S_1$ and $S_2$ ($v_{s1}$ and $V_{s2}$ in the upper plot, respectively). The voltage across capacitor $C_B$ ($v_{CB}$) is observed to remain at a level around the reflected output voltage. The voltage across switch $S_2$ (the added switch), $V_{s2}$, reaches and remains at zero voltage before switch $S_2$ is turned on. Thus, the zero-voltage turn-on is achieved. The voltage across switches $S_1$ and $S_2$ aid in verifying that the switches are never turned off simultaneously. When switch $S_1$ is turned off, switch $S_2$ is already on and the voltage across switch $S_1$ is clamped to voltage $V_{CB}$. This confirms that the voltage stresses of the switches are limited to the reflected output voltage.

Figure 18:
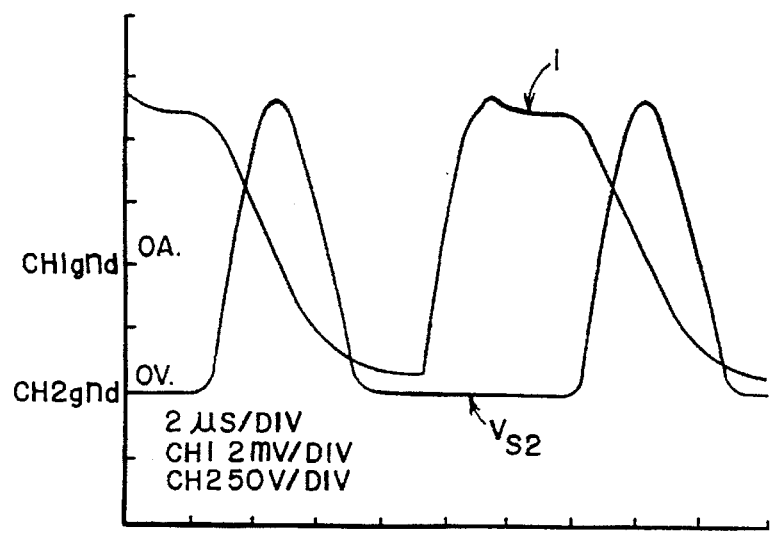
FIG. 18 are diagrams of experimental waveforms for primary current i and $v_{s2}$ of the circuit shown in FIG. 6.
Figure 19:
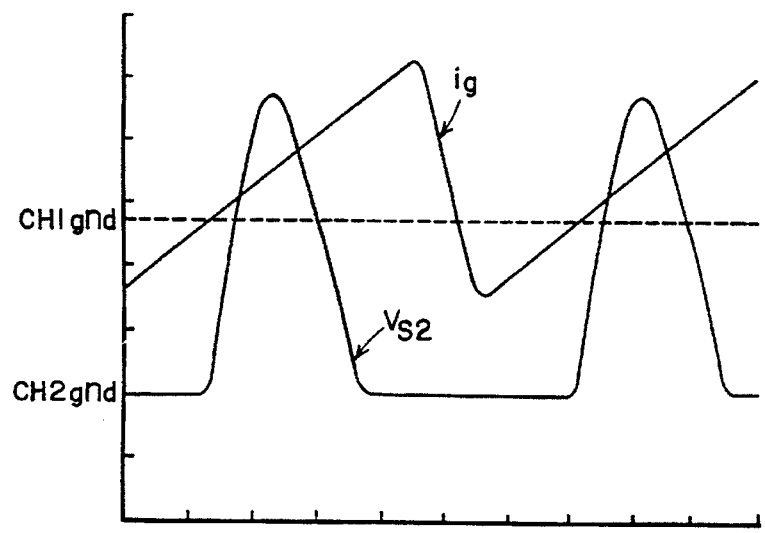
FIG. 19 are diagrams of experimental waveforms for input current $i_g$ and $v_{s2}$ of the circuit shown in FIG. 6.
Figure 20:
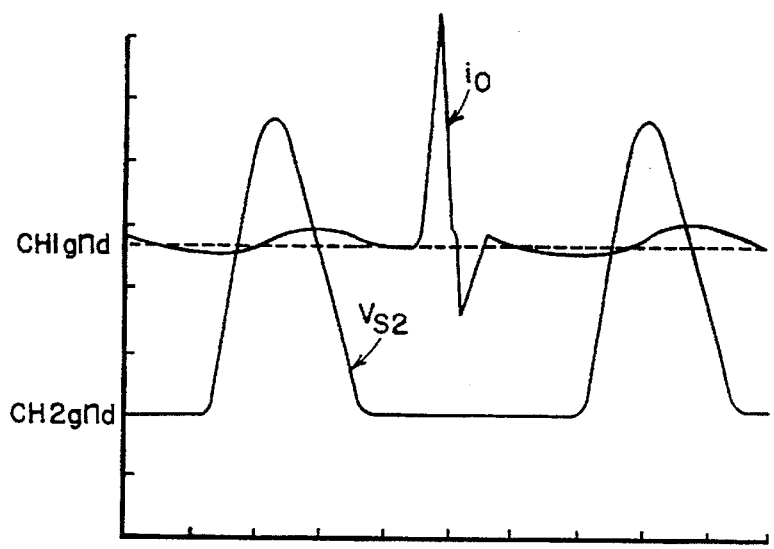
FIG. 20 are diagrams of experimental waveforms for the output rectifier current $i_o$ and $v_{s2}$ of the circuit shown in FIG. 6.

Preliminary results from the experimental setup at very light loads are shown in FIGS. 18, 19, and 20. FIG. 18 shows the current through the primary winding of the transformer and the voltage across switch $S_2$. In this case, the voltage across switch $S_2$ is below the voltage across capacitor $C_B$ because the normalized magnetization current is less than unity. This case occurs only at light load conditions. When switch $S_2$ is turned off, the voltage across it increases sinusoidally to its peak and then decreases to zero. At the same time, the magnetization current decreases from its peak to zero and becomes negative. Once the voltage across switch $S_2$ reaches zero and the magnetization current is negative, the body diode across switch $S_2$ is turned on and latches the current from time $t_1$ to $t_2$. In FIG. 19 there is shown the input choke current and the voltage across switch $S_2$. In light load conditions the input choke current can decrease from its positive peak down to zero and become negative. The negative portion of the input choke current occurs due to the recovery current of the output rectifier that is reflected to the primary.

The current through the output rectifier is shown in FIG. 20. Notice that the magnetization current has also built up to some positive value when the output rectifier is in transition from the reverse recover to its blocking state. The positive magnetizing current will cause diode $D_1$ across switch $S_1$ to naturally conduct, allowing the input choke current to build up linearly even though switch $S_1$ is not turned on. Since the input choke current is less than the magnetization current (latched due to conduction of diode $D_1$ and switch $S_2$), the conduction of diode $D_1$ will be sustained and overlap with the conduction of switch $S_1$. Thus, the duration of current increasing is longer than the duration of the on-time of switch $S_1$. As a result, the recovery duration of the output rectifier becomes beneficial because zero-voltage-switching is established across switch $S_1$ before it is turned on. Finally, the converter can fully operate with zero-voltage-switching for both switches $S_1$ and $S_2$ as described previously.

Figure 21:
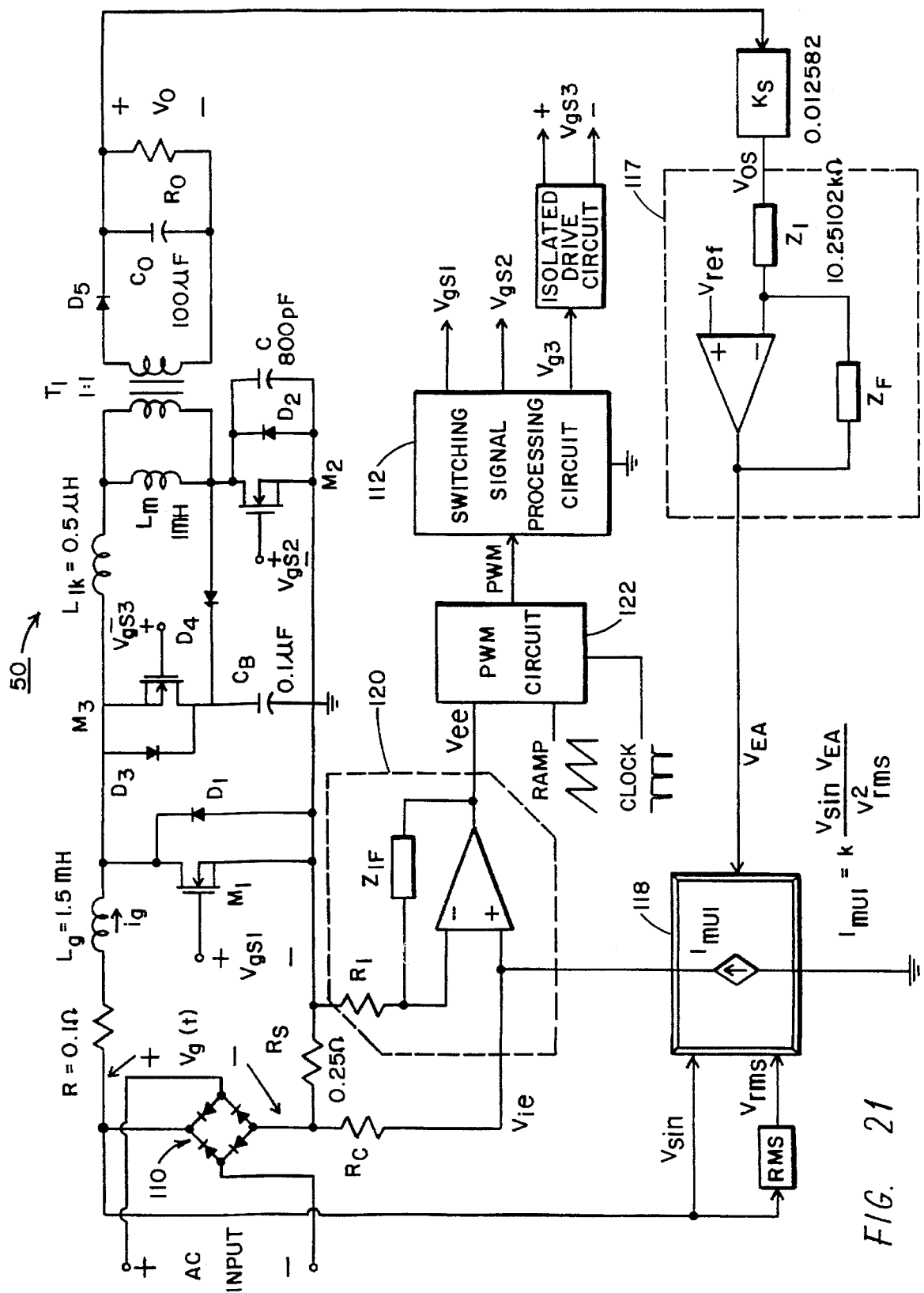
FIG. 21 is a block diagram of the active power factor correction system using ZVS current-fed converter.

In FIG. 21 there is shown a system block diagram incorporating the converter circuit 50 shown in FIG. 6. In circuit 50, switches $S_1$, $S_2$ and $S_3$ being MOSFETS are enabled by switching processing circuit 112 at the time intervals previously discussed. The input voltage of the converter is the rectified sine wave $v_g(t)$ obtained from the output of the full-bridge rectifier 110 connected to an ac source. The ac input of the full-bridge rectifier 110 can be the utility bus voltage having the frequency of 60 or 50 Hz.

The output of rectifier 110 is fed to circuit 50 to produce output voltage $V_o$. The output voltage $V_o$ of circuit 50 is scaled down through circuit $K_s$ and impedance $Z_1$ and compared to the reference voltage $V_{REF}$. The comparison difference is amplified and low pass filtered with amplifier 117 to yield the voltage error $V_{EA}$ which has its steady DC voltage superimposed with the negligible ac component in the steady state.

The voltage error $V_{EA}$ is modulated in device 118 by the rectified sine wave sampled from the pulsating input $V_{sin}(t)$ =$V_g(t)$. The modulation output becomes the controlled current ($I_{MUL}$) which is proportional to the product of $V_{SIN}$ and $V_{EA}$. The product $(R_s+R_c) \times I_{MUL}$ is used as the dynamic reference waveform of which the sinusoidal envelope is tracked by the scaled input current $R_s \times i_g$ using the average-current mode controller 120. The averaged tracking error $V_{ee}$, the output of the controller 120, is fed to the pulse-width modulator circuit 122 which delivers the PWM switching signal as the output to circuit 112. Circuit 112 responds to the PWM switching signal to control the on and off time intervals of switches $S_1$, $S_2$ and $S_3$, as previously described.

In the active power factor correction (APFC) mode using the conventional boost converter, a PWM (pulse width modulation) signal can be used to control the main power switch directly. In this application of the proposed converter, switching signal processing circuit 112 is needed additionally to provide three switching voltages, $v_{gs1}$, $v_{gs2}$ and $v_{gs3}$ which are used to control the MOSFETS $M_1$, $M_2$ and $M_3$ respectively. The switching voltages $v_{gs1}$ and $v_{gs2}$ are almost complementary with some small overlapping on-time and no overlapping off-time. The switching voltages $V_{gs1}$ and $V_{gs3}$ are also almost complementary with sufficient overlapping off-time and no overlapping on-time.

The PWM signal is designed to have the minimum duty ratio of 0.55 and the maximum duty ratio of 0.95. The limited range of the operating duty ratio will provide the satisfactory system performance and the effective core-reset mechanism within the transformer $T_1$.

In addition, the switching signal processing circuit should be capable of shutting down all the switching signals ($V_{gs1}$, $V_{gs2}$ and $V_{gs3}$) to zero voltage in the event that the PWM input signal disappears. This automatic shut-down mechanism will ensure that none of the power MOSFETS is latched-on during the absence of the PWM signal. Since the voltage loop-gain bandwidth of the APFC system is dependent very much on the meansquare of the rectified input voltage, $v_g(t)$, the feed forward of the quantity proportional to the inverse of the mean-square of $v_g(t)$ is used to reduce the variation of the loop gain bandwidth within a certain range of the ac input amplitude. Therefore, the controlled current $I_{MUL}$ driven by the multiplier circuit 120 can be written as $$I_{MUL}(t) = \frac{kv_g(t)v_{ea}(t)}{V_{RMS}^2}$$

where k=0.0031936 is used in the simulation.

The average-current mode controller amplifies the actual tracking error $V_{ie}$ and provides the frequency compensated tracking error $V_{ee}$ as the output. The transfer function $V_{ee}(s)/V_{ie}(s)$ is $$\frac{V_{ee}(s)}{V_{ie}(s)} = \frac{Z_{IF}(s)}{R_I} + 1 \text{ where}$$

$$Z_{IF}(s) = \frac{1 + \frac{s}{\omega_z}}{k_{IS}\left(\frac{s}{\omega_p} + 1\right)}$$

where the constants $\omega_z$, $\omega_p$, and $k_I$ are given by, $\omega_z$=21739.13 rad/sec $\omega_p$=438405.8 rad/sec $k_I$=2.42×10$^{-9}$ The DC output voltage is scaled down by a factor of $K_s$=0.012582 and is low-pass filtered by the voltage comparator of which the transfer function is given by $$\frac{V_{ea}(s)}{V_{ox}(s)} = \frac{K_{LP}}{\frac{s}{\omega_{p0}} + 1}$$

where, $K_{LP}$=8.9747

$\omega_{po}$=252.7806 rad/sec

Figure 22:
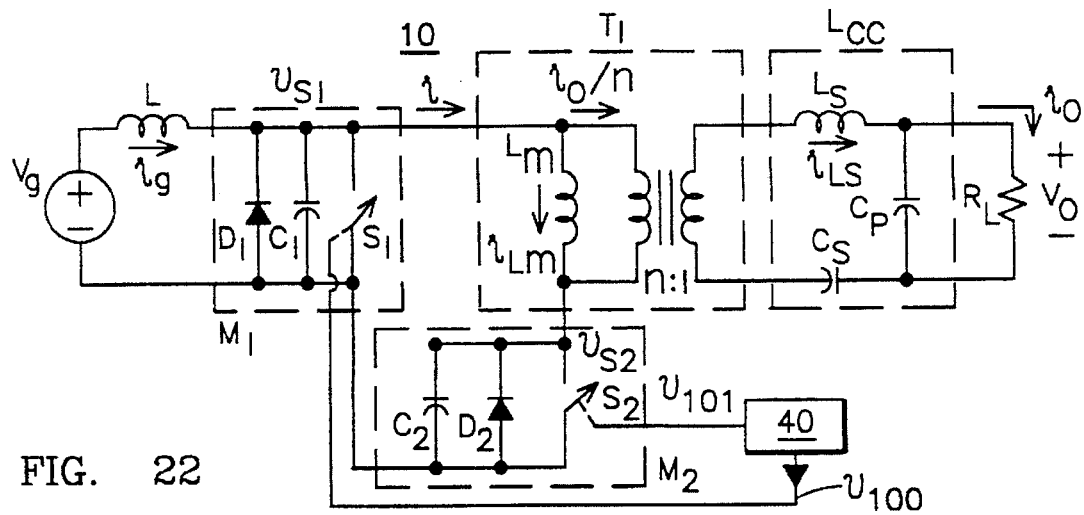
FIG. 22 illustrates an ideal DC-to-AC converter in accordance with the present invention.

The ZVS DC-to-AC converter is derived from the DC-to-DC boost converter of FIG. 1 by replacing the rectifier output circuit with an interface circuit comprising a two-port LCC resonant-link circuit made up of $L_s$, $C_p$ and $C_s$ as shown in FIG. 22. The output port of the LCC resonant-link circuit is terminated in a resistive load, $R_L$. The ZVS occurs during the resonance of the switch parasitic capacitance of the switches, S1 and S2, and the magnetizing inductance of the transformer primary winding. When the switches operate in a complementary fashion at 50% duty ratio, the power transferred to the load is controlled by varying the switching frequency within a specified range.

FIG. 22 shows the ideal DC-to-AC converter with ZVS and output isolation. Switch S1 and diode D1 belong to switching power MOSFET, M1. Switch S2 and diode D2 belong to switching power MOSFET, M2. M2 is connected in series with the primary winding of transformer T1. The transformer T1 has magnetizing inductance, $L_m$ across the primary winding whose leakage inductance is neglected for simplicity. All diodes and switches are assumed to be ideal. Capacitors $C_1$ and $C_2$ across switches S1 and S2, respectively, may be parasitic or components added to make ZVS possible. In a given switching period, $L_m$ and $C_1$ (or $C_2$) form a parallel resonant circuit.

Transformer T1 provides electrical isolation and energy transfer from the input choke, L, and the voltage source, $V_g$ to the output circuit, which has the LCC resonant-link ($L_s$,$C_p$, and $C_s$) and output-load resistor, $R_L$.

The symbol $i_p$ denotes the transformer primary current and has two components, namely, the reflected current, $I_{Ls}/n$, and the magnetizing current, $i_{Lm}$. Assuming that the magnetic flux in the transformer core varies linearly with the magnetizing current, the resonance phenomenon that takes place in the converter circuit enables ZVS, causing the magnetic flux density to become stable and swing about the average value within the linear region of the transformer core characteristics.

Figure 23:
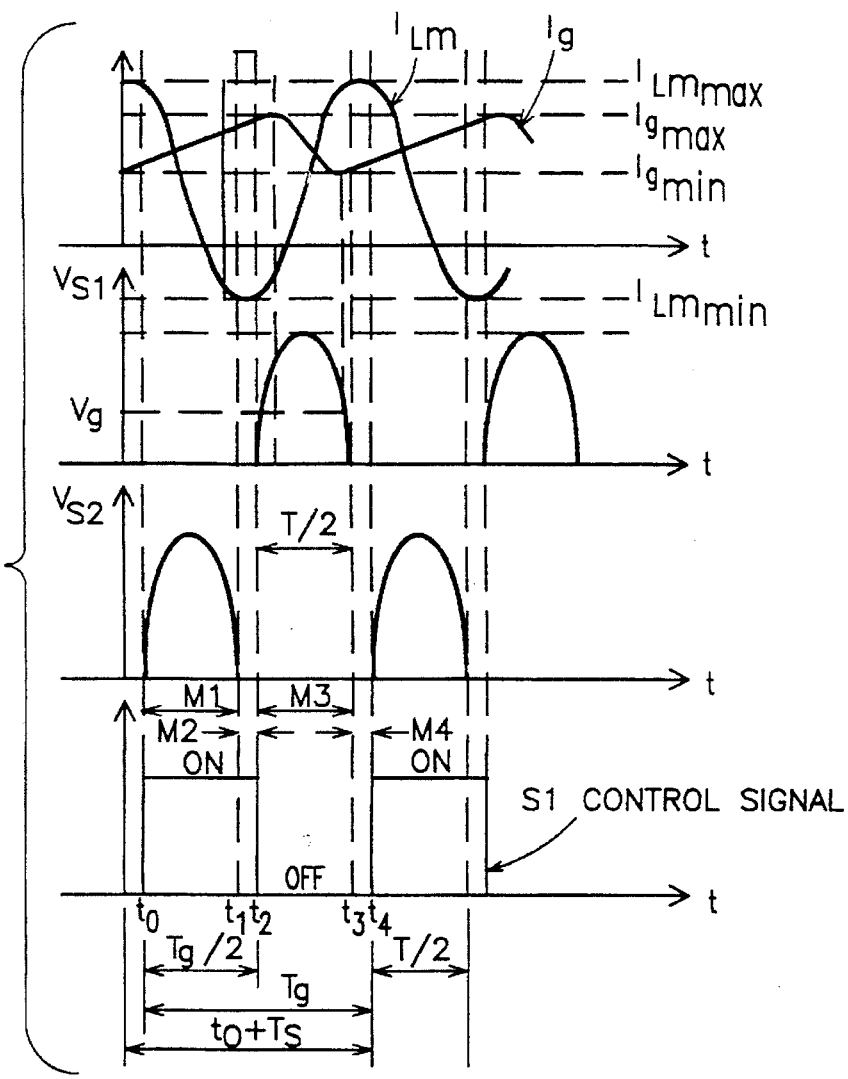
FIG. 23 illustrates steady-state waveforms for the converter of FIG. 22.
Figure 27:
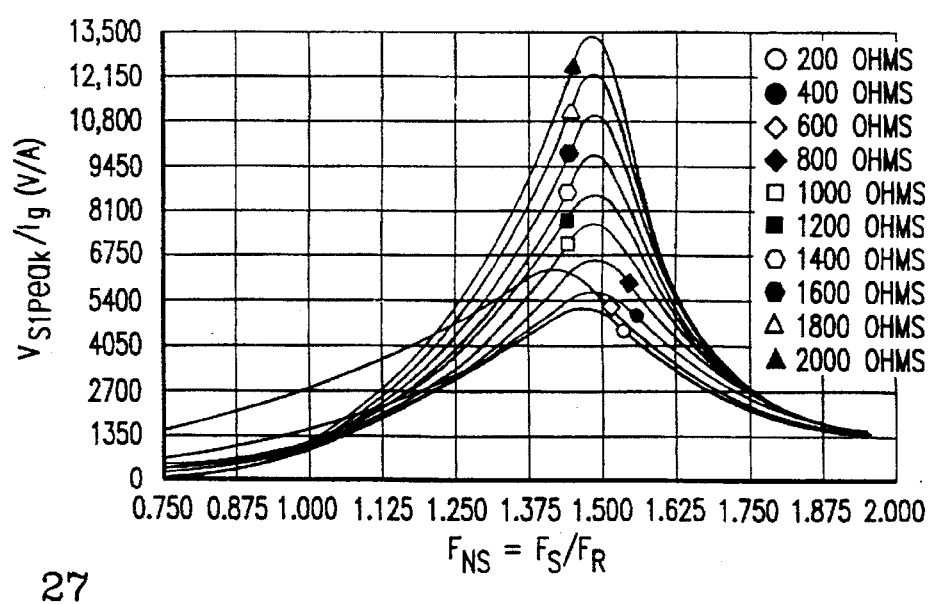
FIG. 27 illustrates peak voltage across switch S1 as a function of normalized switching frequency for the converter of FIG. 22.
Figure 24:
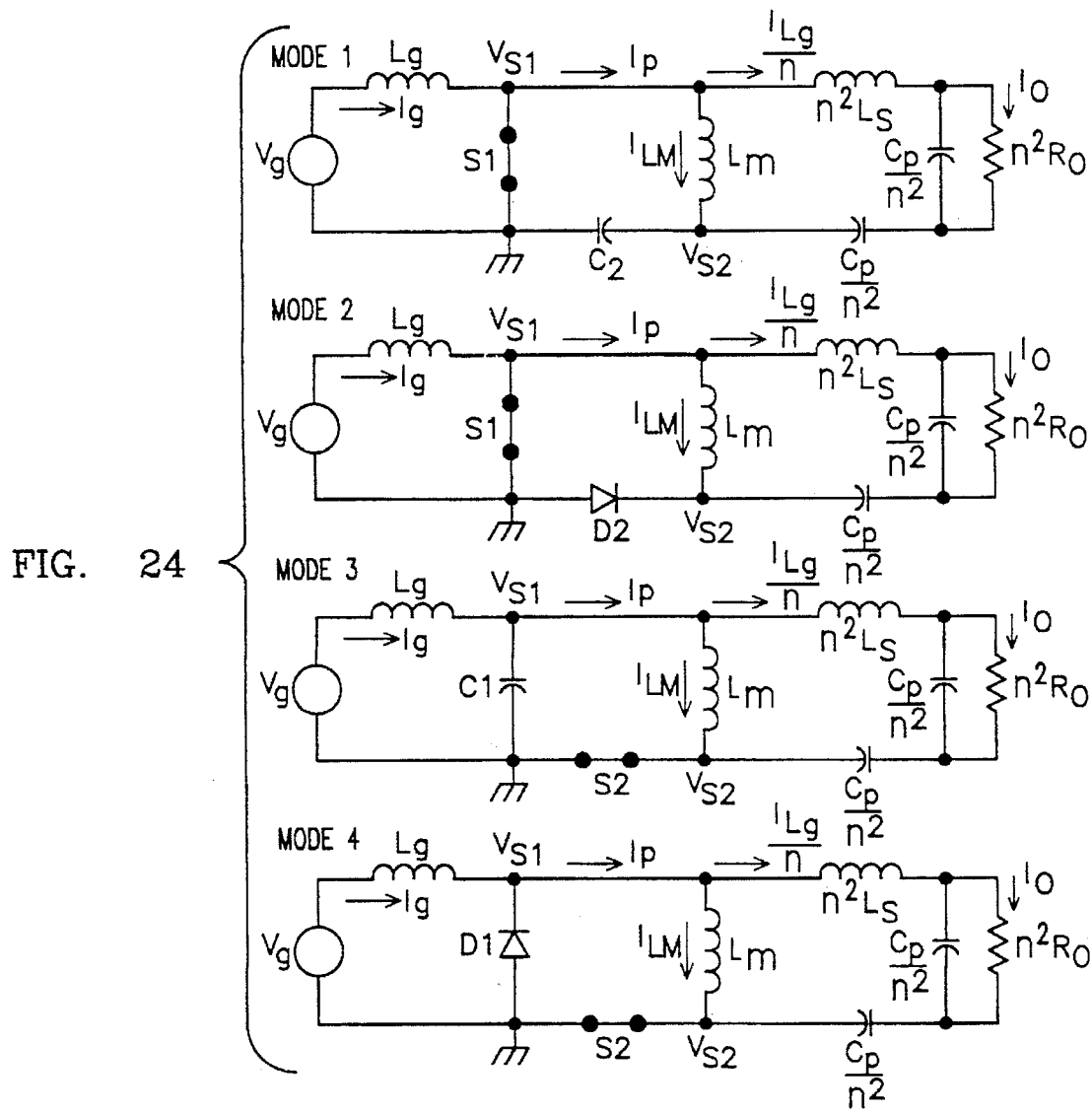
FIG. 24 illustrates steady-state circuit mode configurations for the converter of FIG. 22.

Assuming steady-state operation in continuous conduction mode ($i_g(t)$>0, for all time), the input choke current, $i_g$, the switch voltages $V_{s1}$ and $V_{s2}$, the magnetizing current, $i_{Lm}$, and switch S1 control signal are shown in FIG. 23, with T as the natural period of the circuit resonant frequency, and $T_s$ as the controlled switching period. FIG. 24 shows the converter circuit mode sequence in steady state. At time $t_o$, switch S1 is turned on and S2 is turned off, causing $i_g$ to increase linearly in time, and $V_{s1}$ to remain at zero voltage. As shown in circuit mode M1, which occurs from $t_o$ to $t_1$, $L_m$ and $C_2$ form a resonant circuit, and $i_{Lm}$ and $V_{s2}$ resonate sinusoidally as shown in FIG. 23. Current $i_{Lm}$ drops from $i_{LMMAX}$ to $i_{LMMIN}$ as $V_{s2}$ goes through the positive half-cycle. In mode M2, $D_2$ naturally turns on, causing $V_{s2}$ to stay at zero voltage, while the transformer primary current, $i_p$, goes negative. Magnetizing current $i_{Lm}$ stays at the minimum from $t_1$ to $t_2$ in mode M2. Mode M3 starts at $t_2$ when S1 is turned off and S2 is turned on with ZVS. From $t_2$ to $t_3$, $L_m$ and $C_1$ form a resonant circuit, and current $i_{Lm}$ increases sinusoidally from minimum to maximum, as $V_{s1}$ goes through the positive half-cycle. The input current drops from peak to minimum and begins to rise again at the end of circuit mode M3. At $t_3$, $i_p$ is positive and greater than $i_g$, while $V_{s1}$ is at zero, causing $D_1$ to conduct naturally and circuit mode M4 to begin. From $t_3$ to $t_4$, $i_{Lm}$ stays at maximum, while $i_g$ continues to increase, and $V_{s1}$ is clamped at zero voltage until S1 turns back on at TS+$t_o$ to repeat the cycle.

For simplicity, the input choke and the input voltage source were substituted by a constant-current source. This simplified model leads to specific applications in which the constant-current source is obtained from a current-mode controlled buck converter at the front end of the DC-to-AC converter. Numerical analysis of the complete circuit with the input choke and the input voltage is lengthy and time consuming. Therefore, the circuit with a constant-current source shown in FIG. 22 was used for the numerical analysis.

Differential equations (1) through (6) describe the large signal behavior of the converter in FIG. 22. A FORTRAN program was used to simulate the steady-state response using equations (1) through (6) and a PSPICE program was used to verify the FORTRAN program results. The mathematical signs '∧' and '∨' in equations (1) through (6) stand for 'AND' and 'OR', respectively.

$$\frac{dv_{s1}}{dt} = \begin{cases} 0 \text{ if } (S_1 \text{ ON}) & \vee[(v_{s1}=0) \wedge (I_g - i_{Ls} - i_{Ls}/n < 0)] \\ \frac{I_g}{C_1} - \frac{i_{Ls}}{C_1} - \frac{i_{Ls}}{nC_1} & \text{otherwise} \end{cases} \quad (1)$$

$$\frac{dv_{s2}}{dt} = \begin{cases} 0 \text{ if } (S_2 \text{ ON}) & \vee[(v_{s2}=0) \wedge (i_{Ls} + i_{Ls}/n < 0)] \\ \frac{i_{Ls}}{C_2} + \frac{i_{Ls}}{nC_2} & \text{otherwise} \end{cases} \quad (2)$$

$$\frac{di_{Ls}}{dt} = \begin{cases} \frac{v_{s1}}{L_m} & \text{if } (S_2 \text{ ON}) \\ \frac{v_{s2}}{L_m} & \text{otherwise} \end{cases} \quad (3)$$

$$\frac{di_{Ls}}{dt} = \begin{cases} \frac{v_{s1}}{nL_s} - \frac{v_{cg}}{L_s} - \frac{v_{cp}}{L_s} & \text{if } (S_2 \text{ ON}) \\ -\frac{v_{s2}}{nL_s} - \frac{v_{cs}}{L_s} - \frac{v_{cp}}{L_s} & \text{otherwise} \end{cases} \quad (4)$$

$$\frac{dv_{cg}}{dt} = \frac{i_{Ls}}{C_g} \quad (5)$$

$$\frac{dv_{cp}}{dt} = \frac{i_{Ls}}{C_p} - \frac{v_{cp}}{C_p R_0} \quad (6)$$

After obtaining good correlation between the FORTRAN and PSPICE program results, the Fortran program was modified to generate various steady-state characteristics shown in FIGS. 25 through 29.

The normalized switching frequency, $f_{ns}$, is defined as the ratio of the circuit switching frequency, $f_s$, to the natural frequency $f_r$, of the $L_m$–$C_1$ circuit loop, where $$f_r = (2\Pi \sqrt{L_m C_1})^{-1}$$

Note that ZVS occurs only when the switching frequency is below peaking frequency at each load condition, i.e., $f_{ns} < 1.4$ for load resistance > 400 ohms in the characteristics shown in FIGS. 25–29.

Figure 25:
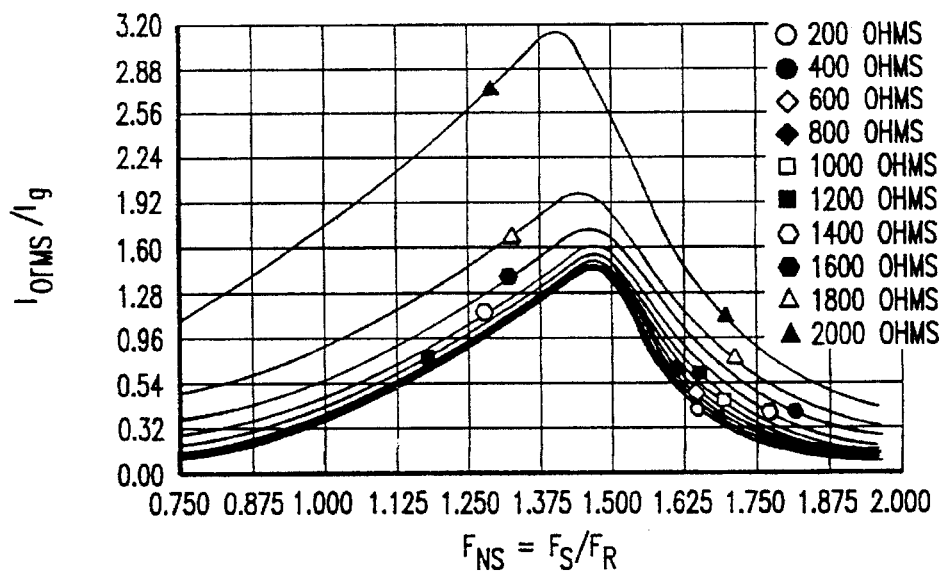
FIG. 25 illustrates RMS load current as a function of normalized switching frequency for the converter of FIG. 22.
Figure 26:
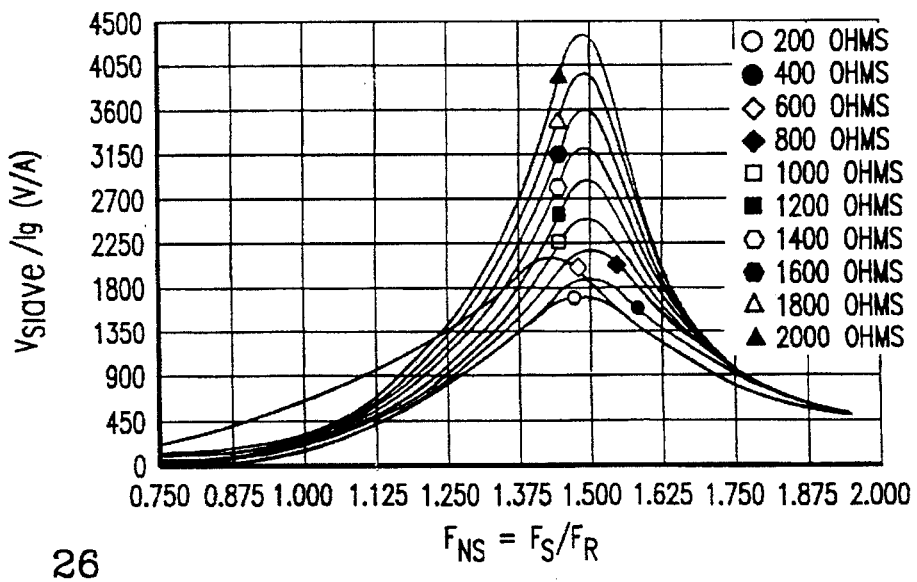
FIG. 26 illustrates average voltage across switch S1 as a function of normalized switching frequency for the converter of FIG. 22.

The range of the switching frequency for ZVS is numerically computed from the characteristics shown in FIGS. 25 and 26. The mathematical condition for ZVS is that the calculated converter efficiency must be unity or very close to unity, otherwise the converter loses the ZVS capability when the efficiency drops below 99%, resulting in the derivative relative to switching frequency changing abruptly at either end of the frequency range. After inspecting the computed efficiency (of greater than 99%), the normalized frequency range for ZVS is between 0.8 and 1.4 for the load range of about 200 to 2,000 ohms. The ZVS frequency range can be used for controlling the power flow to the load with the power ratio (maximum load power divided by minimum load power) of at least 10 for each load resistance.

Figure 31:
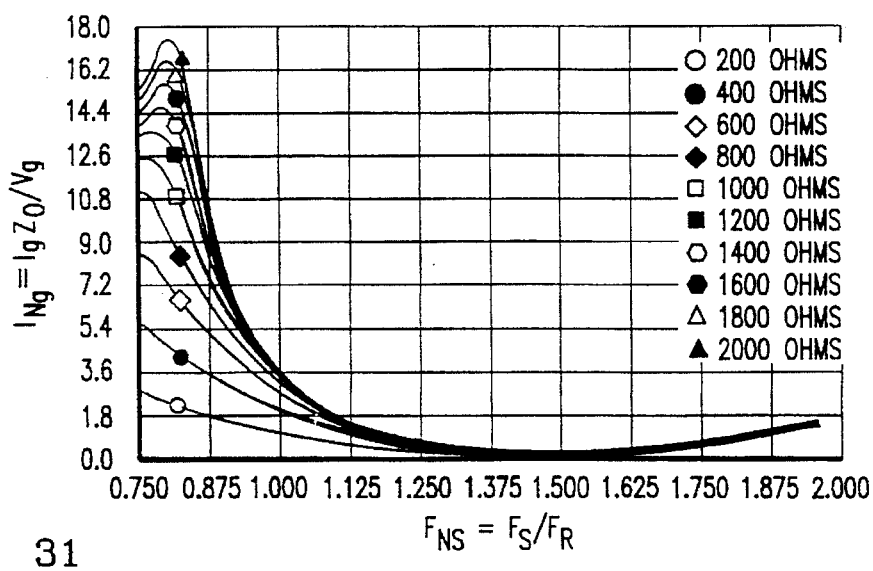
FIG. 31 illustrates normalized DC input current as a function of normalized switching frequency for the converter of FIG. 22.
Figure 28:
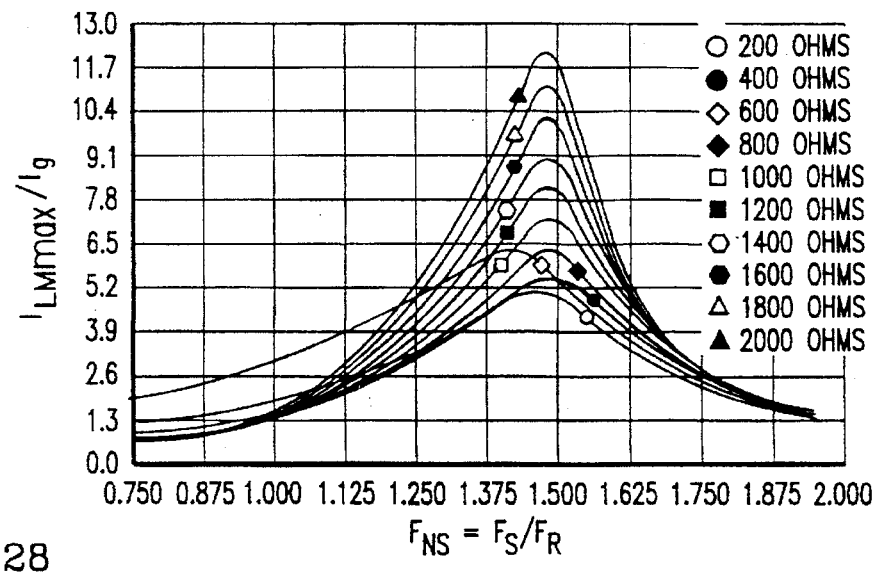
FIG. 28 illustrates peak magnetizing current as a function of normalized switching frequency for the converter of FIG. 22.
Figure 29:
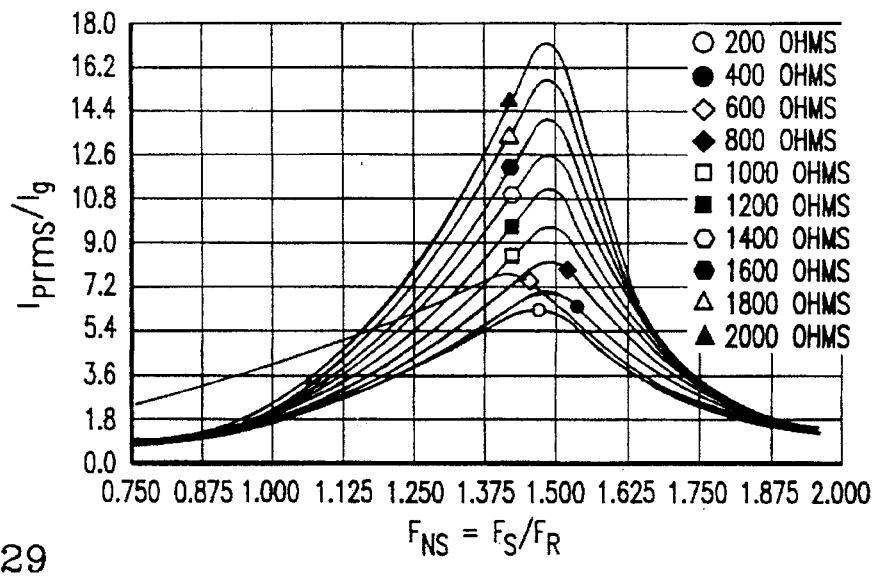
FIG. 29 illustrates primary RMS current as a function of normalized switching frequency for the converter of FIG. 22.
Figure 30:
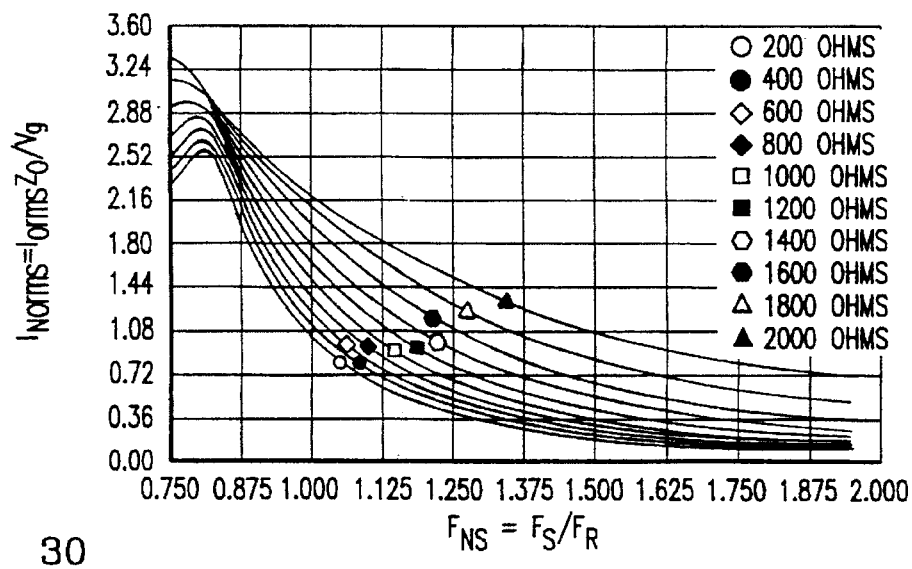
FIG. 30 illustrates normalized RMS load current as a function of normalized switching frequency for the converter of FIG. 22.
Figure 32:
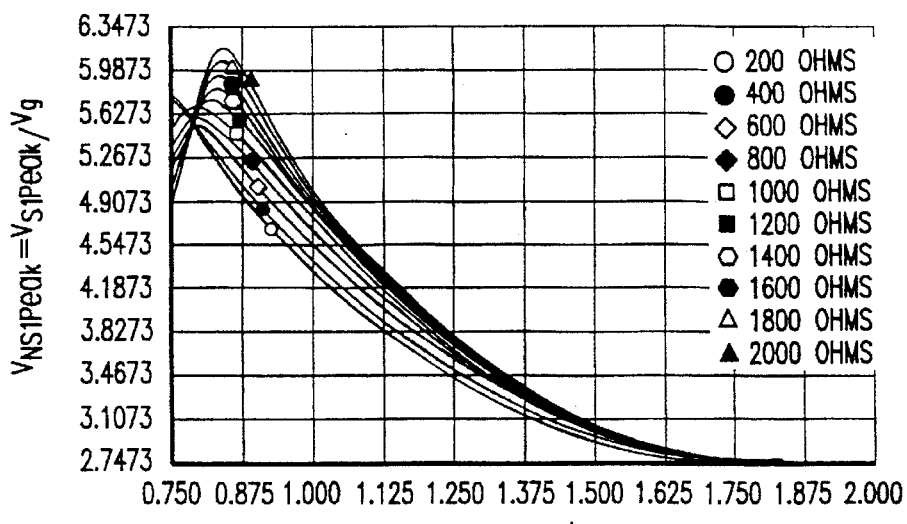
FIG. 32 illustrates normalized peak voltage across switch S1 as a function of normalized switching frequency for the converter of FIG. 22.
Figure 33:
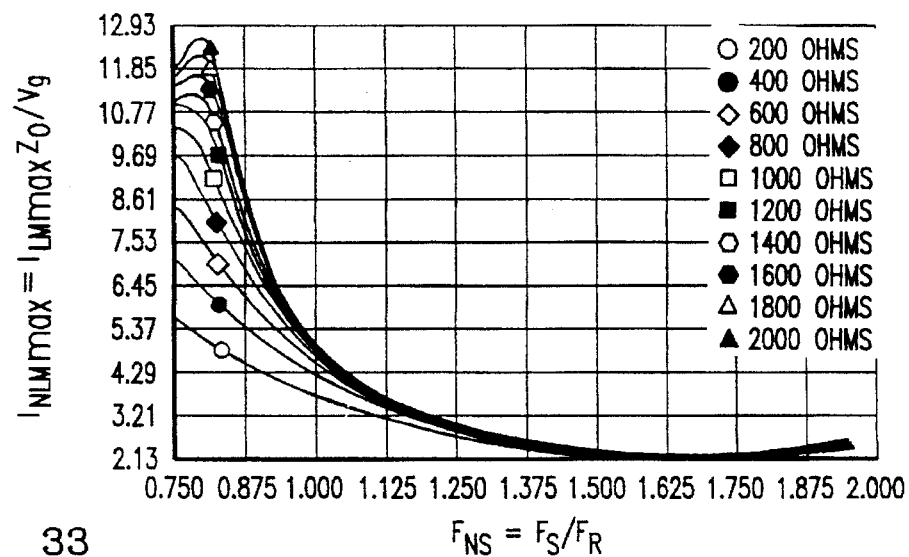
FIG. 33 illustrates normalized peak magnetizing current as a function of normalized switching frequency for the converter of FIG. 22.
Figure 34:
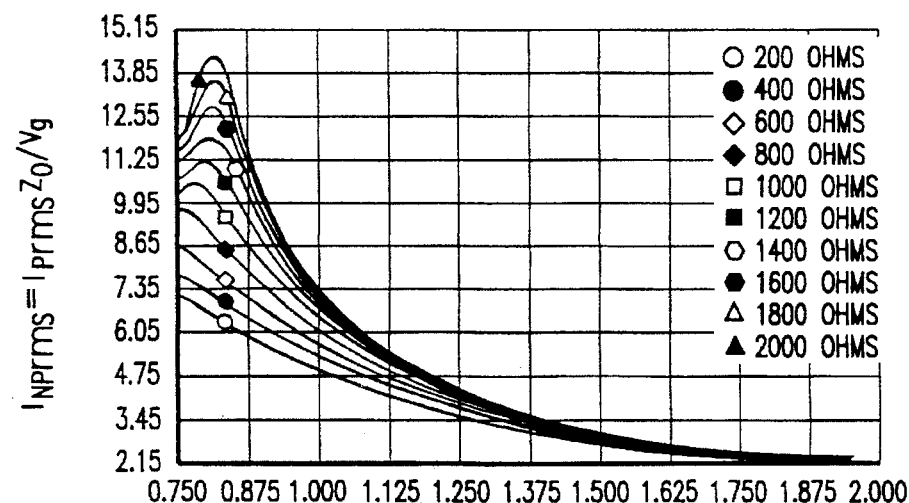
FIG. 34 illustrates normalized primary RMS current as a function of normalized switching frequency for the converter of FIG. 22.

The disclosed DC-to-AC converter was initially developed for a voltage source at the input, thus making the input current, $i_g$, to be one of the converter response state variables. In this design, the steady-state response depends upon the input voltage, the switching frequency, and the converter load condition. In the converter of FIG. 22, the normalized switching frequency below 1.4 will result in ZVS. However, the DC characteristics are different from those obtained from the converter driven by an ideal current source in that the amount of power transferred increases with the switching frequency. On the other hand, the power transferred to the load increases with decreasing switching frequency in the voltage-driven converter. The DC characteristics of the voltage-driven converter can be derived from those of the current-driven converter. By making the DC average voltage across switch S1 constant, a current-driven converter behaves like a voltage-driven converter. Therefore, the DC input current response per volt of driving input voltage for a given frequency range can be computed from the multiplicative inverse of the characteristics shown in FIG. 26, where the multiplicative inverse of a number x is 1/x. Then the resultant DC input current characteristics is normalized as shown in FIG. 31.

The steady-state characteristics for the voltage-driven converter were obtained from multiplying the current-driven converter responses shown in FIGS. 25, 27 through 29 by the input current per volt of driving input voltage computed from characteristics shown in FIG. 26. Plotted as shown in FIGS. 30 and 32 through 34 are the voltage-driven converter characteristics. The normalized quantities are introduced in the characteristics to simplify the numbers. All current responses are normalized to $V_g/Z_0$ and all the voltage responses are normalized to $V_g$ where $Z_0 = (L_m/C_1)^{1/2}$.

The following parameter values were used in the converter simulations:

$I_g = 0.5$ A, $C_1 = C_2 = 1600$ pF, $L_m = 1$ mH, $L_s = 1.225$ mH, $C_s = 15.05$ nF, $C_p = 2.65$ nF, $R_o = 2,000$ Ohms, $n = 1$, and for voltage-driven converter $L_g = 20$ mH.

The simulation results are listed in Tables I and II where $V_{Cmax}$ is peak voltage across switch S1, $V_{Cave}$ is average voltage across switch S1, and $I_{Orms}$ is RMS load current.

The current-driven converter shown in FIG. 22 was simulated in PSPICE to verify the results obtained from the Fortran program. The PSPICE and FORTRAN simulation results are presented in Table I where good correlation between the results can be observed.

TABLE I

PSPICE AND FORTRAN SIMULATION RESULTS FOR CURRENT-DRIVEN CONVERTER

| Switching Frequency | Responses | PSPICE Results | Numerical Results |
|---|---|---|---|
| 125 kHz | $V_{Cmax}$ | 667.2V | 664V |
| | $V_{Cave}$ | 138V | 132V |
| | $I_{Orms}$ | 183.6 mA | 181 mA |
| 180 kHz | $V_{Cmax}$ | 5.92 kV | 5.9 kV |
| | $V_{Cave}$ | 1.867 kV | 1.84 kV |
| | $I_{Orms}$ | 680 mA | 678 mA |

The voltage-driven converter PSPICE and FORTRAN simulation results are presented in Table II. Like Table I, Table II shows good correlation between the PSPICE and FORTRAN simulation results for the voltage-driven converter.

TABLE II

PSPICE AND FORTRAN SIMULATION RESULTS FOR VOLTAGE-DRIVEN CONVERTER

| Switching Frequency | Responses | PSPICE Results | Numerical Results |
|---|---|---|---|
| 125 kHz | $V_{Cmax}$ | 670V | 664V |
| ($V_g = 132V$) | $V_{Cave}$ | 132V | 132V |
| | $I_{Orms}$ | 182 mA | 181 mA |
| 186 KHz | $V_{Cmax}$ | 593V | 590V |
| ($V_g = 184V$) | $V_{Cave}$ | 184V | 184V |
| | $I_{Orms}$ | 67.78 mA | 67.8 mA |

Figure 35:
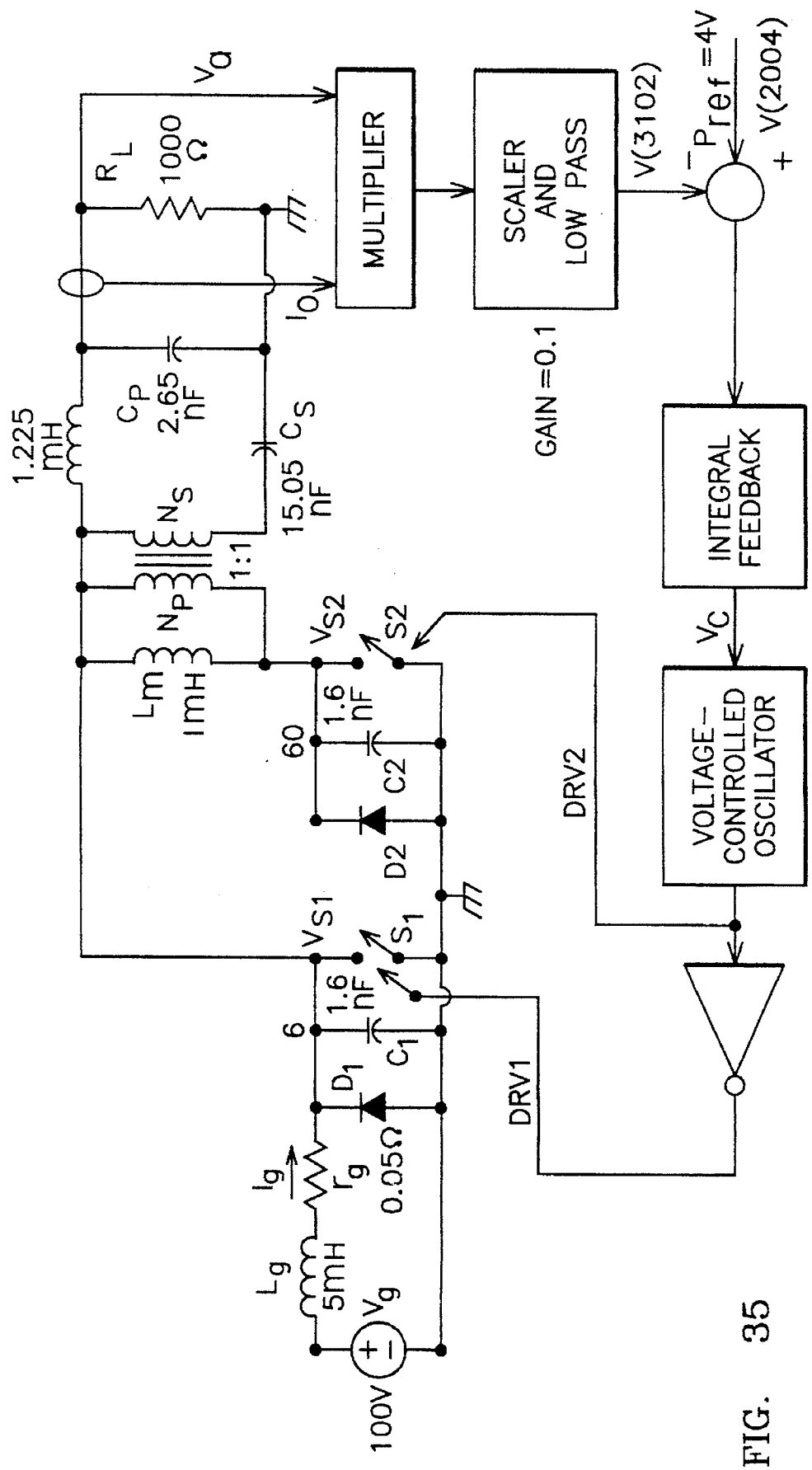
FIG. 35 illustrates the circuit of FIG. 22 in conjunction with a block diagram of a controller suitable for constant power feedback control of the converter.

A typical control block diagram using the proposed converter for constant power feedback control is shown in FIG. 35. The output power is regulated to 40 watts using the integral feedback to program the voltage-controlled oscillator (VCO). The VCO output provides two complementary driving signals which control the power stage switches S1 and S2. The natural frequency of the parallel tank circuit, formed by $L_m$-$C_1$ (or $L_m$-$C_2$) and $L_s$-$C_p$-$C_s$, is above the maximum switching frequency to facilitate ZVS. The switching frequency used in the control is always above the resonant frequency of the $L_s$-$C_p$-$C_s$ circuit for a specified load range. Consequently, the control circuit reduces its driving switching frequency in order to increase the power transferred to the load and vice versa.

Figure 36A:
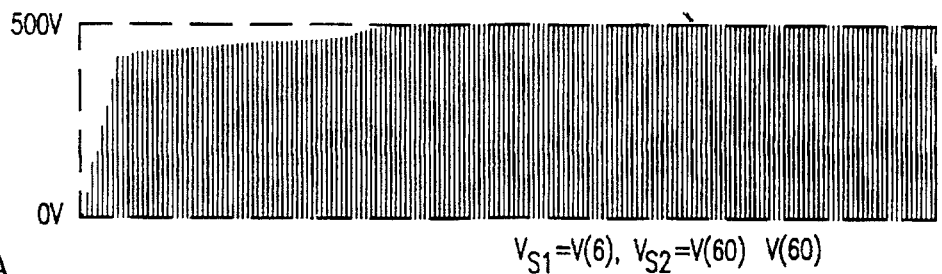
FIGS. 36A–C illustrate transient voltage and current waveforms at a selected power regulation for the converter of FIG. 22.
Figure 36B:
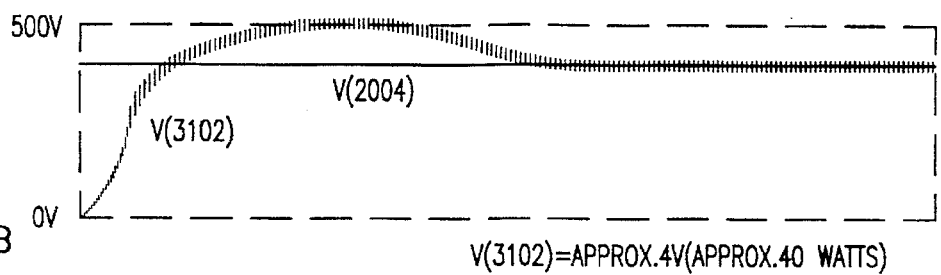
Figure 36C:
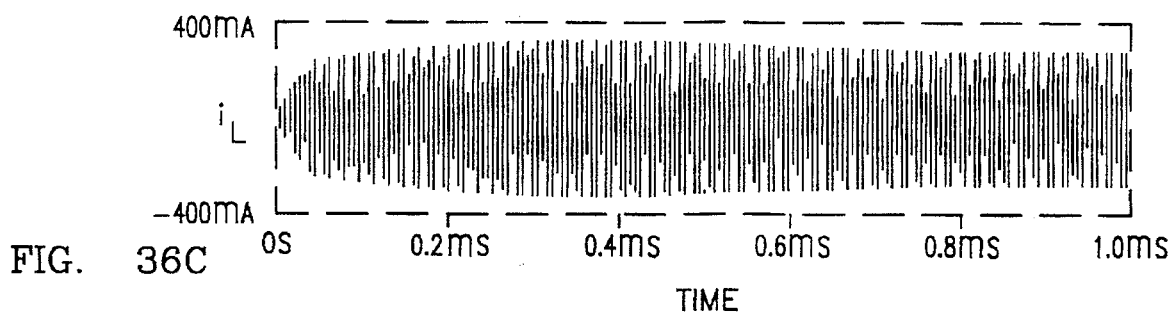

Shown in FIGS. 36a–36c are simulation results of the closed-loop system response. The waveforms in the middle frame, FIG. 36b, show the load power regulated to the reference input power. Signals labeled V(3102) and V(2004) correspond to the load and reference power, respectively.

Figure 37A:
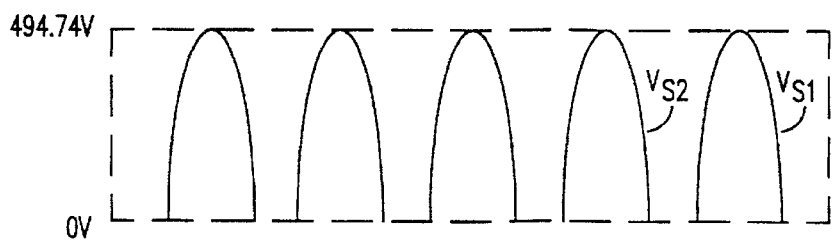
FIGS. 37A–C illustrate steady-state voltage and current waveforms for the converter of FIG. 22 operating at a selected power regulation.
Figure 37B:
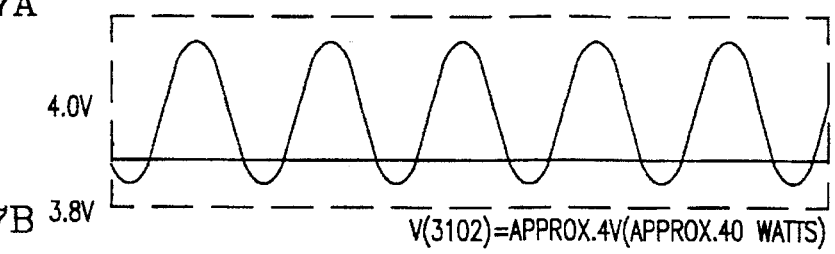
Figure 37C:
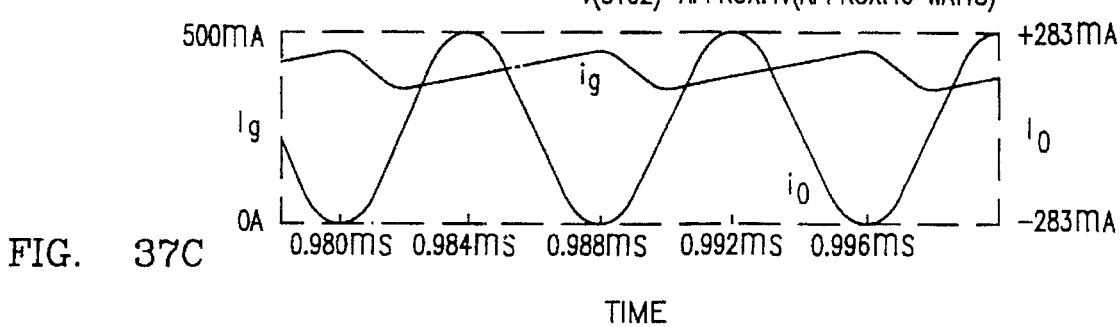

FIGS. 37a–37c show the steady-state waveforms extracted from FIGS. 36a–36c. The voltages across the shunt switch S1 ($V_{s1}$=V(6)) and the series switch S2 ($V_{s2}$= V(60)) are depicted in the top frame, FIG. 37a. These voltages indicate that the ZVS of the switches coincide. The bottom frame, FIG. 37c, shows the input and load current waveforms. The load current waveform is very close to being sinusoidal due to the filtering effect of the $L_s$-$C_p$-$C_s$ circuit.

A new zero-voltage switching, single-ended, current-fed DC-to-AC converter with output isolation, its basic circuit operation, and its steady-state analysis have been presented. It has been shown that the basic circuit topology can be implemented using only two controlled switches: one switch in parallel with the DC current source, and the other switch in series with the primary winding of the output transformer.

The voltage stress across the switches can be made almost identical by selecting the same specifications of their ratings and parasitic components and by assigning $L_g \geq 10 L_m$.

The steady-state analysis was based on two converter models, namely, voltage-driven and current-driven models. The steady-state characteristics of the current-driven converter were derived by numerical analysis and used to generate the voltage-driven converter steady-state characteristics. The analysis showed that the DC-to-AC converter can be operated with either a voltage source or current source.

The DC-to-AC converter switching model was incorporated into a closed-loop, constant-power regulation control scheme to demonstrate the potential applications of the converter in ultrasonic transducer drivers, low-loss FM transmitters, high-voltage DC-to-DC converters, and electronic ballasts. The simulation results of the closed-loop system reveal excellent performance. Because of the ZVS operation, the proposed converter is also attractive to RF applications.

This concludes the description of the preferred embodiments. A reading by those skilled in the art will bring to mind various changes without departing from the spirit and scope of the invention. It is intended, however, that the invention only be limited by the following appended claims.

What is claimed is:

1. A power converter circuit for converting a DC voltage level across a power and a common terminal of a voltage source to a controlled AC voltage level when supplying a load, the circuit comprising:

an input choke having an input and an output terminal, said input terminal being connected to the power terminal of the voltage source;

a main switching means comprising a first switch and a parallel connected diode between the output terminal of the choke and the common terminal for selectively establishing a current through said choke from said voltage source;

a transformer having a primary and a secondary winding, said primary winding having a first and a second input terminal, said first input terminal being connected to said output terminal of said choke;

a secondary switching means connected between the second input terminal of the transformer and the common terminal for selectively establishing a current through said transformer primary winding, said secondary switching means comprising a parallel combination of a capacitor, a diode and a second switch connected between said second input terminal and the common terminal;

a non-rectifying output interface circuit coupling said secondary winding of said transformer to the load; and means for complementarily enabling and disabling said main and said secondary switching means to control current through the transformer primary winding.

2. The power converter circuit as recited in claim 1 further comprising:

a first diode connected in series with a second capacitor across the output terminal of the input choke and the common terminal of the voltage source, said first diode and second capacitor forming a main junction therebetween;

a second diode coupled between the main junction and the second input terminal of the primary winding; and a third switching means connected between the junction and the output terminal of the input choke for suppressing any transient voltages across the main and secondary switching means when current is varied through the transformer.

3. The power converter circuit as recited in claim 2 further comprising means for enabling and disabling the third switching means to regulate the voltage across the second capacitor to a reflected output voltage across the primary winding input terminals.

4. The power converter circuit as recited in claim 3 further comprising:
- a third capacitor connected between said second diode and said main junction; and
- a fourth switching means connected in parallel with said second diode for limiting the voltage across the third capacitor to be within a predetermined range.

5. The power converter circuit as recited in claim 4 wherein said third switching means limits the maximum voltage level across the second capacitor to a predetermined level.

6. The power converter as recited in claim 2 further comprising:
- means for comparing an output voltage across the load with a reference voltage to produce a voltage error voltage;
- means for modulating the error voltage with the voltage source to produce a tracking error voltage; and
- means for enabling and disabling the main and secondary switching means in response to the tracking error voltage.

7. The power converter of claim 1 wherein said output interface circuit comprises a two-port resonant link circuit.

8. The power converter of claim 7 wherein said link circuit comprises a series combination of an inductor and a pair of capacitors, at least one of said pair of capacitors being coupled in parallel with the load.

9. A power converter circuit regulating power to a load comprising:
- an input choke coupled to a direct current voltage source having a power and a common terminal, said choke having a first terminal connected to the power terminal;
- a main switching means coupled in series circuit between a second terminal of the choke and the common terminal of the source for drawing current through the choke;
- a transformer having a primary and a secondary winding, said primary winding having a first terminal coupled to a junction between said main switching means and said input choke;
- a second switching means serially connected between a second terminal of said primary winding and of the voltage source;
- a two-port resonant link circuit coupling the secondary winding to the load; and
- means for enabling and disabling said first and second switching means to vary the effective direction of magnetizing current through said transformer primary winding.

10. The power converter as recited in claim 9 wherein said enabling means enables and disables the second switching means when a voltage level across said second switching means is about zero volts.

11. The power converter as recited in claim 9 wherein said resonant link circuit comprises a series combination of an inductor and a pair of capacitors, at least one of said pair of capacitors being coupled in parallel with the load.

* * * * *